US011312812B2

(12) United States Patent
Norwig et al.

(10) Patent No.: US 11,312,812 B2
(45) Date of Patent: Apr. 26, 2022

(54) PROCESS FOR PRODUCING ELASTOMERS

(71) Applicant: COVESTRO DEUTSCHLAND AG, Leverkusen (DE)

(72) Inventors: Jochen Norwig, Leverkusen (DE); Volker Marker, Burscheid (DE); Jens Langanke, Mechernich (DE); Aurel Wolf, Wülfrath (DE); Christoph Gürtler, Cologne (DE); Philipp Nicholas Wagner, Aachen (DE); Florian Kessler, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 307 days.

(21) Appl. No.: 16/341,223

(22) PCT Filed: Oct. 10, 2017

(86) PCT No.: PCT/EP2017/075856
§ 371 (c)(1),
(2) Date: Apr. 11, 2019

(87) PCT Pub. No.: WO2018/069348
PCT Pub. Date: Apr. 19, 2018

(65) Prior Publication Data
US 2019/0256640 A1 Aug. 22, 2019

(30) Foreign Application Priority Data
Oct. 12, 2016 (EP) .................... 16193573

(51) Int. Cl.
*C08G 18/44* (2006.01)
*C08G 18/22* (2006.01)
*C08G 18/32* (2006.01)
*C08G 18/66* (2006.01)
*C08G 18/67* (2006.01)
*C08G 18/79* (2006.01)
*C08G 64/02* (2006.01)
*C09D 175/04* (2006.01)
*C09J 175/04* (2006.01)
*C08G 18/10* (2006.01)
*C08G 18/82* (2006.01)
*C08G 18/24* (2006.01)

(52) U.S. Cl.
CPC ............ *C08G 18/44* (2013.01); *C08G 18/10* (2013.01); *C08G 18/222* (2013.01); *C08G 18/244* (2013.01); *C08G 18/3206* (2013.01); *C08G 18/6644* (2013.01); *C08G 18/6705* (2013.01); *C08G 18/794* (2013.01); *C08G 18/82* (2013.01); *C08G 64/0291* (2013.01); *C09D 175/04* (2013.01); *C09J 175/04* (2013.01)

(58) Field of Classification Search
None
See application file for complete search history.

(56) References Cited

U.S. PATENT DOCUMENTS

| 3,404,109 | A | 10/1968 | Milgrom |
| 3,829,505 | A | 8/1974 | Herold |
| 3,941,849 | A | 3/1976 | Herold |
| 5,158,922 | A | 10/1992 | Hinney et al. |
| 5,470,813 | A | 11/1995 | Le-Khac |
| 5,482,908 | A | 1/1996 | Le-Khac |
| 5,545,601 | A | 8/1996 | Le-Khac |
| 5,627,120 | A | 5/1997 | Le-Khac |
| 5,712,216 | A | 1/1998 | Le-Khac et al. |
| 5,714,428 | A | 2/1998 | Le-Khac |
| 6,114,436 | A * | 9/2000 | Roesler ............... C08G 18/302 524/588 |
| 6,468,939 | B1 | 10/2002 | Ooms et al. |
| 6,780,813 | B1 | 8/2004 | Hofmann et al. |

(Continued)

FOREIGN PATENT DOCUMENTS

| JP | 4145123 | 5/1992 |
| WO | 2014060329 A1 | 4/2014 |

(Continued)

OTHER PUBLICATIONS

Inoue et al., Copolyermization of Carbon Dioxide and Epoxide with Organometallic Compounds, Macromolecular Chemistry, vol. 130, p. 210-220, 1969 (abstract).

(Continued)

*Primary Examiner* — Christopher M Rodd
(74) *Attorney, Agent, or Firm* — Donald R. Palladino; N. Denise Brown

(57) ABSTRACT

The present invention describes a process for producing an elastomer, preferably a polyurethane-containing elastomer, by reacting a polyol component (A) comprising at least one polyether carbonate polyol (A-1) containing carbon-carbon double bonds with a component (B) which is reactive with OH groups and contains at least one compound reactive toward OH groups, preferably an isocyanate component (B-1) containing NCO groups, in the presence of a free-radical initiator (C), preferably at least one peroxide (C-1), and optionally a catalyst (D), where the molar ratio of the OH-reactive groups of component (B) reactive with groups, to the OH groups of the polyol component (A) containing carbon-carbon double bonds, is greater than 1.0. It further relates to elastomers obtainable by such a process, preferably polyurethane elastomers, the use thereof, and two-component systems for production of elastomers, preferably polyurethane elastomers.

16 Claims, No Drawings

(56) References Cited

U.S. PATENT DOCUMENTS

| | | | |
|---|---|---|---|
| 8,816,036 B2* | 8/2014 | Maliverney | B01J 31/1805 528/55 |
| 10,087,282 B2 | 10/2018 | Chung et al. | |
| 2002/0040093 A1* | 4/2002 | Hobel | C08G 18/6625 524/555 |
| 2003/0158449 A1 | 8/2003 | Hofmann et al. | |
| 2003/0204042 A1 | 10/2003 | Moethrath et al. | |
| 2007/0232773 A1* | 10/2007 | Endo | C08G 18/12 528/44 |
| 2011/0028642 A1 | 2/2011 | Xie et al. | |
| 2015/0232606 A1 | 8/2015 | Wamprecht et al. | |
| 2015/0284501 A1* | 10/2015 | Wamprecht | C08G 18/3206 528/58 |
| 2016/0177046 A1 | 6/2016 | Torres et al. | |
| 2016/0185903 A1 | 6/2016 | Muller et al. | |
| 2016/0000865 A1 | 7/2016 | Geng et al. | |
| 2016/0000866 A1 | 7/2016 | Lindner et al. | |
| 2016/0200865 A1* | 7/2016 | Muller | C08G 64/42 523/400 |
| 2016/0200866 A1 | 7/2016 | Muller et al. | |
| 2021/0107865 A1 | 4/2021 | Guo et al. | |

FOREIGN PATENT DOCUMENTS

| | | | | |
|---|---|---|---|---|
| WO | WO-2014060300 A2 * | 4/2014 | | C08G 18/34 |
| WO | WO-2015032737 A1 * | 3/2015 | | C08G 64/34 |
| WO | 2020064631 A1 | 4/2020 | | |
| WO | 2022026082 A1 | 2/2022 | | |

OTHER PUBLICATIONS

Kember, Michael R. et al., Catalysts for $CO_2$/epoxide copolymerisation, Chemical Communications, vol. 47, p. 141-163, 2011.

Hanser-Verlag, Carl, Plastics Handbook, vol. VII, p. 96-102, 1966, Vieweg and Hochtlen eds.

Ulrich, Henri, Chemistry and Technology of Isocyanates, p. 98, 1996, John Wiley & Sons, Chester, NY.

* cited by examiner

PROCESS FOR PRODUCING ELASTOMERS

CROSS-REFERENCE TO RELATED APPLICATIONS

This application is a national stage application under 35 U.S.C. § 371 of PCT/EP2017/075856, filed Oct. 10, 2017, which claims the benefit of European Application No. 16193573.9, filed on Oct. 12, 2016, both of which are incorporated by reference herein.

FIELD

The present invention describes a process for producing elastomers, preferably polyurethane elastomers. It further relates to elastomers obtainable by such a process, preferably polyurethane elastomers, to the use thereof and to two-component systems for production of elastomers, preferably polyurethane elastomers.

BACKGROUND

Polyurethane elastomers based on naphthalene 1,5-diisocyanate (NDI; e.g. Desmodur® 15 from Covestro AG), a long-chain polyesterpolyol and a short-chain alkanediol were commercialized more than 60 years ago under the Vulkollan® trade name from Covestro AG. In this context, it is a feature of Vulkollans® that, as well as excellent mechanical-dynamic properties, they also have excellent qualities with regard to sustained use characteristics compared to many other materials. Swelling characteristics in many organic solvents are also at a remarkably favorable level.

Long-chain polyols used to date, aside from polyester polyols, have also been polyether polyols, polycarbonate polyols and polyetherester polyols. The choice of long-chain polyol is guided mainly by the requirements of the respective application. In this connection, reference is also made to "tailored properties". For example, polyether polyols are used when hydrolysis stability and low-temperature properties are important. For polyester polyols, advantages arise over polyether polyols with regard to mechanical properties and UV stability. However, one disadvantage is low microbe resistance, for example. To a certain degree, polycarbonate polyols combine the advantages of polyether polyols and polyester polyols. The advantages of polycarbonate polyols lie particularly in their UV stability, hydrolysis stability, especially under acidic conditions, and mechanical properties.

A disadvantage of polyester polyols and polycarbonate polyols and of their blend products, the polyestercarbonate polyols, with respect to the polyether polyols is that their low-temperature characteristics are usually less advantageous. This is for structural reasons and arises from the elevated polarity of the carbonyl groups, the effect of which is normally that polyester polyols and polycarbonate polyols are semicrystalline, whereas polyether polyols, especially the propylene oxide-based types, the major group in commercial terms, are amorphous.

The use temperature range is limited at the upper end by the thermal characteristics of the hard segments (e.g. urethane, urea, isocyanurate groups etc.), i.e. of the structural elements present in the polyisocyanate units.

A further substance class of polyols that are useful in principle for the production of polyurethane elastomers is that of polyethercarbonate polyols. Preparation of polyether carbonate polyols by catalytic reaction of alkylene oxides (epoxides) and carbon dioxide in the presence of H-functional starter substances (starters) has been the subject of intensive study for more than 40 years (e.g. Inoue et al., Copolymerization of Carbon Dioxide and Epoxide with Organometallic Compounds; Die Makromolekulare Chemie [Macromolecular Chemistry] 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is highly advantageous from an environmental standpoint since this reaction is the conversion of a greenhouse gas such as $CO_2$ to a polymer. A further product formed, actually a by-product, is the cyclic carbonate shown in scheme (I) (for example, when $R=CH_3$, propylene carbonate).

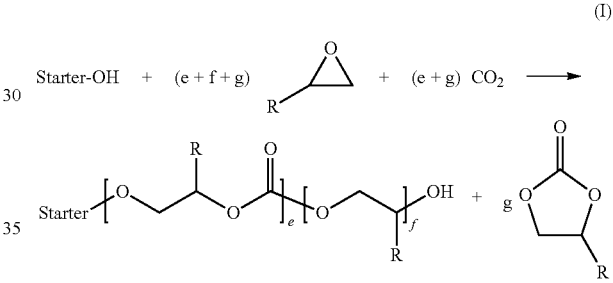

EP 2 845 872 A1 discloses a process for preparing polyethercarbonate polyols with side chains, comprising the steps of: (α) initially introducing a catalyst and (αα) a suspension medium that does not contain any H-functional groups and/or (αβ) an H-functional starter compound; (γ) metering in carbon dioxide and at least two alkylene oxides, where these alkylene oxides may be the same as or different than the alkylene oxide(s) metered in in step (γ), where the difference in the molecular weight of the lightest and heaviest of the alkylene oxides metered in in stage (γ) is not less than 24 g/mol and the lightest alkylene oxide is a C2-C4-alkylene oxide and where, in addition, if no H-functional starter compound has been initially introduced in step (α), step (γ) comprises the metered addition of an H-functional starter compound. Also claimed is the use of the polyethercarbonate polyol as crosslinkable component within a crosslinking reaction for production of thermoset or elastomeric networks.

WO 2014/060329 A1 relates to a process for producing polyurethane elastomers, wherein, in a first step i), an NCO-terminated prepolymer is formed from the components from the group consisting of A) at least one organic polyisocyanate containing at least two NCO groups and B) at least one polyol having a number-average molecular weight of 500 to 5000 g/mol and a functionality of 2 to 4, in the presence of C) optionally catalysts and/or D) optionally auxiliaries and additives, and, in a second step ii), the prepolymer from step i) is reacted exclusively with components from the group consisting of E) one or more chain extenders and/or crosslinkers having a number average molecular weight of 60 to 490 g/mol, a functionality of 2 to 3 and exclusively OH groups as isocyanate-reactive groups in the molecule, in the presence of F) optionally catalysts and/or G) optionally auxiliaries and additives, where the molar ratio of the sum total of the CO groups from A) to the sum total of the isocyanate-reactive groups from B) and E) is 0.9:1 to 1.2:1 and component B) contains at least one polyethercarbonate polyol in an amount of at least 20% by weight, based on component B), which is obtained by addition of carbon dioxide and alkylene oxides having three or four carbon atoms onto H-functional starter substances using catalysts.

Unsaturated polyethercarbonate polyols are crosslinkable via their double bonds. For instance, WO 2015/032645 A1 discloses a process for preparing mercapto-crosslinked polyethercarbonates and sees polyethercarbonate polyols containing double bonds being reacted with polyfunctional mercaptans and/or sulfur with the involvement of initiator compounds.

WO 2015/032737 A1 relates to a process for preparing polyethercarbonate polyols, the polyethercarbonate polyols comprising double bonds, comprising the steps of:
 (α) initially introducing a catalyst and
  (αα) a suspension medium containing H-functional groups and/or
  (αβ) an H-functional starter compound
 (γ) metering in carbon dioxide, an alkylene oxide which contains no unsaturated group, and at least one unsaturated compound,
where the unsaturated compound metered in in step (γ) are selected from the group of the unsaturated alkylene oxides and/or unsaturated cyclic anhydrides, where
 (γ1) one of the unsaturated compounds comprises a double bond comprising at least one substituent selected from the group of —$OX^1$, —$OCOX^1$, —X', —$CH_2OX^1$ and/or —CH–CH$X^1$, where $X^1$ in each case is substituted or unsubstituted alkyl, substituted or unsubstituted cycloalkyl, substituted or unsubstituted aryl or a substituted or unsubstituted methylene chain;
 (γ2) and another of the unsaturated compounds comprises a double bond comprising at least one substituent selected from the group of —F, —Cl, —Br, —I, —COH, —$COX^2$, —$COOX^2$, —C≡N and/or —$NO_2$ or is an unsaturated, substituted or unsubstituted cyclic anhydride of an organic dicarboxylic acid, where $X^2$ in each case is substituted or unsubstituted alkyl, substituted or unsubstituted cycloalkyl, substituted or unsubstituted aryl or a substituted or unsubstituted methylene chain.

WO 2015/000903 A1 discloses polyurethane resin compositions comprising polyethercarbonate polyols for production of polyurethane composites from the corresponding PU resins, wherein organic polyisocyanate components are reacted with isocyanate-reactive components and foaming agents. The polyethercarbonate polyols as isocyanate-reactive component is obtained here by addition of $CO_2$ and alkylene oxides onto H-functional starter compounds in the presence of a double metal cyanide catalyst (DMC).

It is desirable to conduct the production of elastomers, preferably polyurethane elastomers, in a reactive process of maximum simplicity, in which a macroscopically elastic, polymeric network is formed via two different linkage steps. For the purpose of shaping, the mixture is to be conveyable by means of standard industrial apparatuses and machines such as hinders, screws, and single- and twin-screw extruders. Optionally, the two linkage steps are to be activatable independently of one another, such that the mixture can be processed further by shaping after the first linkage step.

SUMMARY

It is an object of the present invention to provide a process for producing an elastomer, preferably a polyurethane elastomer, from such a reactive mixture, in which currently available polyethercarbonate polyols can be used.

The objective was to provide an elastomer having improved mechanical properties without significantly altering the starting components used or adding additional components, in order to be able to utilize existing plant technology. The object was specifically to provide elastomers, preferably polyurethane-based elastomers, having improved tensile properties with similar or better hardness and good thermal cycling stability.

The object was achieved in accordance with the invention by reacting a polyol component (A) containing at least one polyethercarbonate polyol (A-1) containing carbon-carbon double bonds with an OH group-reactive component (B) containing at least one compound reactive toward OH groups, preferably an isocyanate component (B-1) containing NCO groups, in the presence of a free-radical initiator (C), preferably at least one peroxide (C-1), and optionally of a catalyst (D), wherein the molar ratio of the OH-reactive groups in the OH group-reactive component (B), preferably the NCO groups of the isocyanate component (B-1), to the OH groups of the polyol component (A) containing carbon-carbon double bonds is greater than 1.0, preferably from 1.1 to less than 2.0 and more preferably from 1.2 to 1.6.

In one embodiment, the process for producing the elastomer, preferably a polyurethane-containing elastomer, comprises the following steps:
 i) reacting a polyol component (A) comprising at least one polyethercarbonate polyol (A-1) containing carbon-carbon double bonds with an OH group-reactive component (B) containing at least one compound reactive toward OH groups, preferably an isocyanate component (B-1) containing NCO groups, to give a reaction product, preferably to give a polyurethane, and
 ii) crosslinking the reaction product obtaining in i), preferably the polyurethane, in the presence of at least one free-radical initiator (C), preferably at least one peroxide (C-1),
wherein the molar ratio of the OH-reactive groups in the OH group-reactive component (B), preferably the NCO groups of the isocyanate component (B-1), to the OH groups of the polyol component (A) containing carbon-carbon double bonds is greater than 1.0, preferably from 1.1 to less than 2.0 and more preferably from 1.2 to 1.6.

In an alternative embodiment, the process for producing the elastomer, preferably a polyurethane-containing elastomer, comprises the following steps:
 (iii) reacting a polyol component (A) comprising at least one polyethercarbonate polyol (A-1) containing carbon-carbon double bonds with at least one free-radical initiator (C), preferably at least one peroxide (C-1),
 (iv) reacting the product obtaining in step (iii) with an OH group-reactive component (B) comprising at least one compound reactive toward OH groups, preferably an isocyanate component (B-1) containing NCO groups, optionally in the presence of a catalyst (D).
wherein the molar ratio of the OH-reactive groups in the OH group-reactive component (B), preferably the NCO groups of the isocyanate component (B-1), to the OH groups of the polyol component (A) containing carbon-carbon double bonds is greater than 1.0, preferably from 1.1 to less than 2.0 and more preferably from 1.2 to 1.6.

DETAILED DESCRIPTION

Unless indicated otherwise, the term "double bond" in the context of the present application means a carbon-carbon double bond that is not part of an aromatic system.

In the process of the invention, polyethercarbonate polyols are also understood to mean polyethercarbonate polyols, polyetherpolyestercarbonate polyols and/or polycarbonate polyols.

Polyol Component (A)

In one embodiment of the process of the invention, the polyol component (A) consists to an extent of >90% by weight, preferably of >95% by weight, more preferably of >99% by weight, of the polyethercarbonate polyol (A-1).

Polyethercarbonate Polyol (A-1)

In a further configuration of the process of the invention, the polyethercarbonate polyol (A-1) containing carbon-carbon double bonds has a content of carbon-carbon double bonds of 0.5% by weight to 17.0% by weight, preferably of 1.0% by weight to 6.0% by weight.

The content of carbon-carbon carbon-carbon double bonds in the polyethercarbonate polyol for the polyethercarbonate polyol containing carbon-carbon double bonds is found as the quotient of the reported double bond content of the polyethercarbonate polyols used reported in $C_2H_2$ equivalents per unit total mass of the polyethercarbonate polyol, and is reported in $C_2H_2$ equivalents per unit mass of polyethercarbonate polyol.

In a further configuration of the process of the invention, the polyethercarbonate polyol (A-1) containing carbon-carbon double bonds has a $CO_2$ content of 0.5% by weight to 50% by weight, preferably of 5% by weight to 25% by weight.

In a further configuration of the process of the invention, the polyethercarbonate polyol containing carbon-carbon double bonds is obtainable by addition of an alkylene oxide, at least one monomer containing carbon-carbon double bonds and $CO_2$ onto an H-functional starter compound in the presence of a double metal cyanide catalyst.

In the process of the invention, alkylene oxides used may be alkylene oxides having 2-45 carbon atoms. The alkylene oxides having 2-45 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, alkylene oxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example glycidol ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. Alkylene oxides used are preferably ethylene oxide and/or propylene oxide, especially propylene oxide. If ethylene oxide and propylene oxide are used in a mixture, the molar EO/PO ratio is 1:99 to 99:1, preferably 5:95 to 50:50. If ethylene oxide and/or propylene oxide are used in a mixture with other unsaturated alkylene oxides, the proportion thereof is 1 to 40 mol %, preferably 2 to 20 mol %.

A catalyst that may be used for preparing the polyether carbonate polyols according to the invention is, for example, a DMC catalyst (double metal cyanide catalyst). Other catalysts may also be employed alternatively or in addition. For the copolymerization of alkylene oxides and $CO_2$ zinc carboxylates or cobalt salen complexes for example may be employed alternatively or in addition. Suitable zinc carboxylates are for example zinc salts of carboxylic acids, in particular dicarboxylic acids, such as adipic acid or glutaric acid. An overview of the known catalysts for the copolymerization of alkylene oxides and $CO_2$ is provided for example by Chemical Communications 47 (2011) 141-163.

The catalyst is preferably a DMC catalyst.

The double metal cyanide compounds present in the DMC catalysts preferentially employable in the process of the invention are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and allow for preparation of polyether carbonates at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by
(1) in the first step reacting an aqueous solution of a metal salt with the aqueous solution of a metal cyanide salt in the presence of one or more organic complex ligands, for example an ether or alcohol,
(2) in the second step removing the solid from the suspension obtained from (a) by known techniques (such as centrifugation or filtration),
(3) in a third step optionally washing the isolated solid with an aqueous solution of an organic complex ligand (for example by resuspending and subsequent reisolation by filtration or centrifugation),
(4) and subsequently drying the obtained solid at temperatures of in general 20-120° C. and at pressures of in general 0.1 mbar to atmospheric pressure (1013 mbar), optionally after pulverizing,
and by, in the first step or immediately after the precipitation of the double metal cyanide compound (second step), adding one or more organic complex ligands, preferably in excess (based on the double metal cyanide compound) and optionally further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (II), $$M(X)_n \quad (II)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, and M is preferably $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate, and n is 2 when X=halide, hydroxide, carboxylate, cyanate, thiocyanate, isocyanate, isothiocyanate or nitrate, or suitable metal salts preferably have a composition according to the general formula (III), $$M_r(X)3 \quad (III)$$

where

M is selected from the metal cations $Fe^{3+}$, $Al^{3+}$, $Co^{3+}$ and $Cr^{2+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts preferably have a composition according to the general formula (IV)

$$M(X)_s \quad (IV)$$

where

M is selected from the metal cations $Mo^{4+}$, $V^{4+}$ and $W^{4+}$,

X comprises one or more (i.e. different) anions, preferably an anion selected from the group consisting of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate, and s is 4 when X=halide, hydroxide, carboxylate, cyanate, thiocyanate, isocyanate, isothiocyanate or nitrate, or suitable metal salts preferably have a composition according to the general formula (V)

$$M(X)_t \quad (V)$$

where

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate, and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_a M'(CN)_b(A)_c \quad (VI)$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, where the values of a, b and c are chosen so to ensure the electrical neutrality of the metal cyanide salt; a is preferably 1, 2, 3 or 4; b is preferably 4, 5 or 6; c preferably has the value of 0.

Examples of suitable metal cyanide salts are sodium hexacyanocobaltate(III), potassium hexacyanocobaltate (III), potassium hexacyanoferrate(ID, potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z \quad (VII)$$

in which M is as defined in formulae (I) to (IV) and

M' is as defined in formula (V), and x, x', y and z are integers chosen so as to ensure electrical neutrality of the double metal cyanide compound.

It is preferable when x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, α,β unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/139883.

In the second step, the solid (i.e. the precursor of the catalyst) can be isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, for example, water-soluble by-products, such as potassium chloride, can be removed from the catalyst that can be used in accordance with the invention. Preferably, the amount of the organic complex ligand in the aqueous wash solution is between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solids more than once. In a first washing step (3.-1), washing takes place preferably with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous washing solution is more preferably between 40% and 80% by weight, based on the overall solution of the first washing step. In the further washing steps (3.-2), either the first washing step is repeated one or more times, preferably from one to three times, or, preferably, a nonaqueous solution, such as a mixture or solution of unsaturated alcohol and further complex-forming component (preferably in the range between 0.5% and 5% by weight, based on the total amount of the wash solution of step (3.-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

For the preparation of the polyethercarbonate polyols of the invention, in addition, at least one H-functional starter compound is used.

As suitable H-functional starter compounds (starters) it is possible to use compounds having H atoms that are active in respect of the alkoxylation. Alkoxylation-active groups having active H atoms include, for example, —OH, —NH$_2$ (primary amines), —NH— (secondary amines), —SH, and —CO$_2$H, preference being given to —OH and —NH$_2$, particular preference being given to —OH. As H-functional starter substance it is possible for there to be, for example, one or more compounds selected from the group encompassing mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine© products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters which contain on average at least 2 OH groups per molecule are, for example, commercial products such as Lupranol Balance® (BASF AG), Merginol® products (Hobum Oleochemicals GmbH), Sovermol' products (Cognis Deutschland GmbH & Co. KG), and Soyol® products (USSC Co.).

Employable monofunctional starter compounds include alcohols, amines, thiols and carboxylic acids. Employable monofunctional alcohols include: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-Butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. Employable monofunctional thiols include: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1, 4-diol, butyne-1,4-diol, neopentyl glycol, pentane-1,5-diol, methylpentanediols (for example β-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols constructed from repeating propylene oxide and/or ethylene oxide units are, for example, the Desmophen®, Acclaim®, Arcol®, Baycoll®, Bayfill®, Bayflex®, Baygal®, PET® and polyether polyols from Covestro AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycolle 13D 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, the Pluriol® P products from BASF SE, and suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 glmol. Polyester polyols used may be at least difunctional polyesters. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Alcohol components employed include for example ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the stated alcohols. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

As H-functional starter substances it is additionally possible to use polycarbonate diols, especially those having a molecular weight Mn in a range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples relating to polycarbonates are found for example in EP-A 1359177. Examples of polycarbonate diols that may be used include the Desmophee C range from Covestro AG, for example Desmophen® C 1100 or Desmophen® C 2200.

In a further embodiment of the invention, it is possible to use polyethercarbonate polyols and/or polyetherestercarbonate polyols as H-functional starter substances. In particular it is possible to use polyetherester carbonate polyols. These polyetherestercarbonate polyols used as H-functional starter substances may for this purpose be prepared in a separate reaction step beforehand.

The H-functional starter substances generally have an OH-functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula (VIII)

$$HO\text{—}(CH_2)_X\text{—}OH \qquad \text{(VIII)}$$

where x is a number from 1 to 20, preferably an even number from 2 to 20. Examples of alcohols of formula (VII) are ethylene glycol, butane-1,4-diol, hexane-1,6-diol, octane-1, 8-diol, decane-1,10-diol and dodecane-1,12-diol. Further preferred H-functional starter substances are neopentyl glycol, trimethylolpropane, glycerol, pentaerythritol, reaction products of the alcohols of formula (VII) with s-caprolactone, for example reaction products of trimethylolpropane with ε-caprolactone, reaction products of glycerol with ε-caprolactone and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and more particularly a molecular weight $M_n$ in the range from 62 to 3000 g/mol.

The $CO_2$ used in accordance with the invention must have a purity level of at least 80%, preferably of at least 95%, where the proportion of sulfur-containing impurities, such as COS and $SO_2$, must be below 1% by weight, preferably below 0.1% by weight. Preference is given to using $CO_2$ obtained as by-product in ammonia production, ethylene oxide production, by the water-gas shift reaction, in combustion processes, preferably in power plants, or in lime burning. There may be a need for subsequent purification steps in which sulfur-containing impurities in particular, but also carbon monoxide, are removed. Inert gases, such as nitrogen or argon, may be present up to a content of below 20%, preferably below 5%. Particular preference is given to using $CO_2$ which is obtained as by-product in ammonia production or is prepared by water-gas shift reaction since $CO_2$ from these sources has particularly low contents of sulfur-containing impurities.

In a further configuration of the process, the monomer containing carbon-carbon double bonds is selected from at least one of the monomers from one or more of the groups consisting of
(a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, such as oleic acid, linoleic acid, conjuene fatty acid, or linolenic acid, partly epoxidized fats and oils, such as partly epoxidized soya oil, linseed oil, rapeseed oil, palm oil or sunflower oil, and/or mixtures thereof.
(b) alkylene oxide with double bond of the general formula (IX):

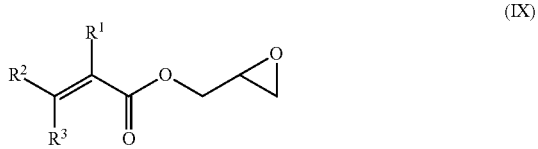

where $R_1$ to $R_3$ are independently H, halogen, substituted or unsubstituted C1-C22 alkyl or substituted or unsubstituted C6-C12 aryl. As preferred representatives of the group of the glycidyl esters of α, β-unsaturated acids, the compounds of formula (IX) above display a substitution pattern which is particularly suitable for the synthesis of polyethercarbonate polyols having unsaturated groups. This class of compound can be reacted with high yields, by means of the DMC catalyst employable in accordance with the invention, to give polyethercarbonate polyols having unsaturated groups. Furthermore, as a result of the steric and electronic conditions in the region of the double bond, there may be good opportunities for further reaction to give higher-molecular-weight, crosslinked polyethercarbonate polyols.
(c) cyclic anhydride conforming to the formula (X), (XI) or (XII):

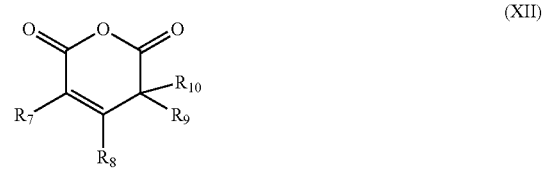

where $R_1$ to $R_{10}$ are independently H, halogen, substituted or unsubstituted C1-C22 alkyl or substituted or unsubstituted C6-C12 aryl. Preferred compounds of the formula (IX), (X) (XI) are maleic anhydride, halogen- or alkyl-substituted maleic anhydrides, and itaconic anhydride. and
(d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

In a further configuration of the process, the monomer containing carbon-carbon double bonds is selected from at least one of the monomers from one or more of the groups consisting of
(a) allyl glycidyl ether, vinylcyclohexene oxide and limonene oxide,
(b) glycidyl acrylate and glycidyl methacrylate,
(c) maleic anhydride and itaconic anhydride and
(d) 4-cyclohexene-1,2-dioic anhydride and 5,6-norbornene-2,3-dioic anhydride.

In a further embodiment of the process of the invention, the monomer containing carbon-carbon double bonds is selected from maleic anhydride and/or allyl glycidyl ether, preferably maleic anhydride.

The molar ratio of the saturated alkylene oxides used to the at least one further monomer containing carbon-carbon double bonds is from 55.0 mol % to 99.5 mol %, preferably from 60.0 mol % to 99.0 mol %.

The at least one further monomer containing carbon-carbon double bonds may be in a random or blockwise distribution in the polyethercarbonate polyols containing carbon-carbon double bonds. Gradient polymers can also be used.

The term "terpolymerization" in the sense of the invention comprehends the polymerization of at least one alkylene oxide, at least one further monomer containing carbon-carbon double bonds, and CO$_2$. Terpolymerization in the sense of the invention also includes, in particular, the copolymerization of a total of more than three monomers.

One preferred embodiment of the process which is usable in accordance with the invention for preparation of polyethercarbonate polyols (A-1) containing carbon-carbon double bonds is characterized in that ($\alpha$) [first activation stage] a suspension medium containing no H-functional groups, an H-functional starter compound, a mixture of a suspension medium which contains no H-functional groups and an H-functional starter compound, or a mixture of at least two H-functional starter compounds is introduced initially, and optionally water and/or other volatile compounds are removed by elevated temperature and/or reduced pressure, with the DMC catalyst being added to the suspension medium which contains no H-functional groups, the H-functional starter compound, the mixture of a suspension medium which contains no H-functional groups and the H-functional starter compound, or the mixture of at least two H-functional starter compounds, before or after the first activation stage, ($\beta$) [second activation stage] a portion (based on the total amount of alkylene oxides used in steps ($\beta$) and ($\gamma$)) of one or more alkylene oxides is added to the mixture resulting from step ($\alpha$), it being possible for the addition of a portion of alkylene oxide to take place optionally in the presence of CO$_2$ and/or inert gas (such as nitrogen or argon, for example), and it also being possible for step ($\beta$) to take place two or more times, ($\gamma$) [polymerization stage] one or more alkylene oxides, at least one unsaturated compound (alkylene oxide and/or cyclic anhydride), and carbon dioxide are metered continually into the mixture resulting from step ($\beta$), and the alkylene oxides used for the terpolymerization may be the same as or different from the alkylene oxides used in step ($\beta$).

There follows a detailed description of this preferred embodiment using the example of the polyethercarbonate polyols:

Step ($\alpha$):

The addition of the individual components in step ($\alpha$) may take place simultaneously or in succession in any order; preferably, in step ($\alpha$), the DMC catalyst is introduced first, and, simultaneously or subsequently, the suspension medium which contains no H-functional groups, the H-functional starter compound, the mixture of a suspension medium which contains no H-functional groups and the H-functional starter compound, or the mixture of at least two H-functional starter compounds is added.

The subject of one preferred embodiment is a process in which in step ($\alpha$) [first activation stage]

($\alpha$1) a reactor is charged with the DMC catalyst and a suspension medium and/or one or more H-functional starter compounds, ($\alpha$2) an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

The subject of another preferred embodiment is a method in which in step ($\alpha$) [first activation stage]

($\alpha$1) a suspension medium which contains no H-functional groups, an H-functional starter compound, a mixture of a suspension medium which contains no H-functional groups and an H-functional starter compound, or a mixture of at least two H-functional starter compounds is initially introduced, optionally under inert gas atmosphere, under an atmosphere of inert gas/carbon dioxide mixture, or under a pure carbon dioxide atmosphere, more preferably under inert gas atmosphere, and ($\alpha$2) an inert gas, an inert gas/carbon dioxide mixture or carbon dioxide, more preferably inert gas, is introduced into the resulting mixture of the DMC catalyst and the suspension medium which contains no H-functional groups, the H-functional starter compound, the mixture of a suspension medium which contains no H-functional groups and the H-functional starter compound, or the mixture of at least two H-functional starter compounds, at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example), it being possible for the double metal cyanide catalyst to be added to the suspension medium which contains no H-functional groups, the H-functional starter compound, the mixture of a suspension medium which contains no H-functional groups and the H-functional starter compound, or the mixture of at least two H-functional starter compounds in step ($\alpha$1) or immediately thereafter in step ($\alpha$2).

The DMC catalyst may be added in solid form or in suspension in a suspension medium and/or in an H-functional starter compound. If the DMC catalyst is added as a suspension, it is added preferably in step ($\alpha$1) to the suspension medium and/or to the one or more H-functional starter compounds.

Step ($\beta$):

Step ($\beta$) of the second activation stage may take place in the presence of CO$_2$ and/or inert gas. Step ($\beta$) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The start of the metered addition of the alkylene oxide may take place at any supply pressure chosen beforehand. The total pressure (in absolute terms) of the atmosphere is set in step (3) preferably in the range from 10 mbar to 100 bar, preferably 100 mbar to 50 bar, and more preferably 500 mbar to 50 bar. Optionally, during or after the metering of the alkylene oxide, the pressure is under closed-loop control by introduction of further carbon dioxide, with the pressure (absolute) being 10 mbar to 100 bar, preferably 100 mbar to 50 bar, and more preferably 500 mbar to 50 bar.

In one preferred embodiment, the amount of one or more alkylene oxides used in the case of the activation in step ($\beta$) is 0.1% to 25.0% by weight, preferably 1.0% to 20.0% by weight, more preferably 2.0% to 16.0% by weight, based on the amount of suspension medium and/or H-functional starter compound used in step ($\alpha$). The alkylene oxide may be added in one step or in a stepwise addition in two or more portions.

In one particularly preferred embodiment of the invention, a portion (based on the total amount of the amount of alkylene oxides used in steps (β) and (γ)) of one or more alkylene oxides, in the case of the activation in step (β) [second activation stage], is added to the mixture resulting from step (α), it being possible for the addition of a portion of alkylene oxide to take place optionally in the presence of $CO_2$ and/or inert gas. Step (β) may also take place more than once. The DMC catalyst is preferably used in an amount such that the amount of DMC catalyst in the resulting polyethercarbonate polyol containing double bonds is 10 ppm to 10 000 ppm, more preferably 20 ppm to 5000 ppm and most preferably 50 ppm to 500 ppm.

In the second activation step, the alkylene oxide may be added, for example, in one portion or over the course of 1 to 15 minutes, preferably 5 to 10 minutes. The duration of the second activation step is preferably 15 to 240 minutes, more preferably 20 to 60 minutes.

Step (γ):

The metering of the alkylene oxide(s), of the unsaturated compounds, also referred to below as monomers, and of the carbon dioxide may take place simultaneously, or alternately, or sequentially, and the overall amount of carbon dioxide may be added all at once or in a metered way over the reaction time. During the addition of the monomers it is possible for the $CO_2$ pressure, gradually or in steps, to be raised or lowered or left the same. Preferably, the total pressure is kept constant during the reaction by metered addition of further carbon dioxide. The metering of the monomers may take place simultaneously, alternately, or sequentially to the metering of carbon dioxide. It is possible to meter the monomers at a constant metering rate or to raise or lower the metering rate continuously or in steps, or to add the monomers portionwise. The monomers are preferably added at constant metering rate to the reaction mixture. If two or more alkylene oxides are used for synthesis of the polyether carbonate polyols containing double bonds, the alkylene oxides may be metered in individually or as a mixture. The metered addition of the alkylene oxides can be effected simultaneously, alternately or sequentially, each via separate metering points (addition points), or via one or more metering points, in which case the alkylene oxides can be metered in individually or as a mixture. Via the nature and/or sequence of the metering of the monomers and/or of the carbon dioxide it is possible to synthesize random, alternating, blocklike or gradientlike polyether carbonate polyols containing double bonds.

Preference is given to using an excess of carbon dioxide, relative to the calculated amount of carbon dioxide needed in the polyethercarbonate polyol containing double bonds, since an excess of carbon dioxide is an advantage, governed by the slowness of carbon dioxide to react. The amount of carbon dioxide can be specified by way of the total pressure. A total pressure (absolute) which has proven advantageous is the range from 0.01 to 120 bar, preferably 0.1 to 110 bar, more preferably from 1 to 100 bar, for the copolymerization for preparing the polyethercarbonate polyols containing double bonds. It is possible to supply the carbon dioxide to the reaction vessel continuously or discontinuously. This is dependent on the rate at which the monomers and the $CO_2$ are consumed and on whether the product is to include optionally $CO_2$-free polyether blocks or blocks with different $CO_2$ contents. The concentration of the carbon dioxide may also vary during the addition of the monomers. Depending on the reaction conditions selected, it is possible for the $CO_2$ to be introduced into the reactor in the gaseous, liquid or supercritical state. $CO_2$ may also be added to the reactor as a solid and then converted to the gaseous, dissolved, liquid and/or supercritical state under the chosen reaction conditions.

In step (γ), the carbon dioxide can be introduced into the mixture, for example, by
(i) sparging the reaction mixture in the reactor from below,
(ii) using a hollow-shaft stirrer,
(iii) a combination of metering forms as per (i) and (ii), and/or
(iv) sparging via the surface of the liquid, by using multilevel stirring elements.

Step (γ) is conducted, for example, at temperatures of 60 to 150° C., preferably from 80 to 120° C., most preferably from 90 to 110° C. If temperatures below 60° C. are set, the reaction ceases. At temperatures above 150° C. the amount of unwanted by-products rises significantly.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the bottom of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed monomers) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas sucked from the gas space above the reaction mixture and compressed, optionally mixed with fresh carbon dioxide and/or monomers, is introduced back into the reaction mixture as per (i), (ii), (iii) and/or (iv).

The pressure drop which comes about through incorporation of the carbon dioxide and the monomers into the reaction product in the terpolymerization is preferably balanced out by means of freshly metered carbon dioxide.

The monomers may be introduced separately or together with the $CO_2$, either via the liquid surface or directly into the liquid phase. The monomers are introduced preferably directly into the liquid phase, since this has the advantage of rapid mixing between the monomers introduced and the liquid phase, so preventing local concentration peaks of the monomers. The introduction into the liquid phase can be effected via one or more inlet tubes, one or more nozzles or one or more annular arrangements of multiple metering points, which are preferably arranged at the base of the reactor and/or at the side wall of the reactor.

The three steps (α), (β) and (γ) can be performed in the same reactor, or each can be performed separately in different reactors. Particularly preferred reactor types are stirred tanks, tubular reactors and loop reactors. If the reaction steps (α), (β) and (γ) are performed in different reactors, a different reactor type can be used for each step.

Polyethercarbonate polyols containing double bonds can be prepared in a stirred tank, in which case the stirred tank, depending on design and mode of operation, is cooled via the reactor shell, internal cooling surfaces and/or cooling surfaces within a pumped circulation system. Both in semi-batchwise application, in which the product is not removed until after the end of the reaction, and in continuous application, where the product is removed continuously, particular attention should be given to the metering rate of the monomers. It should be set so that, in spite of the inhibitory effect of the carbon dioxide, the monomers are depleted sufficiently rapidly by reaction. The concentration of free monomers in the reaction mixture during the second activation stage (step β) is preferably >0 to 100 wt %, more preferably >0 to 50 wt %, very preferably >0 to 20 wt % (based in each case on the weight of the reaction mixture). The concentration of free monomers in the reaction mixture during the reaction (step γ) is preferably >0% to 40% by weight, more preferably >0% to 25% by weight, very preferably >0% to 15% by weight (based in each case on the weight of the reaction mixture).

Another possible embodiment for the copolymerization (step γ) is characterized in that one or more H-functional starter compounds as well are metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). When performing the process continuously, the amount of the H-functional starter compounds metered into the reactor continuously during the reaction is preferably at least 80 mol % equivalents, particularly preferably 95 to 99.99 mol % equivalents (in each case based on the total amount of H-functional starter compounds).

In one preferred embodiment, the catalyst/starter mixture activated in steps (α) and (β) is reacted further in the same reactor with the monomers and carbon dioxide. In another preferred embodiment, the catalyst/starter mixture activated in steps (α) and (β) is reacted further in a different reaction vessel (for example, a stirred tank, tubular reactor or loop reactor) with the monomers and carbon dioxide. In a further preferred embodiment, the catalyst/starter mixture prepared in step (α) is reacted in a different reaction vessel (for example, a stirred tank, tubular reactor or loop reactor) in steps (γ) and (γ) with the monomers and carbon dioxide.

In the case of reaction in a tubular reactor, the catalyst/starter mixture prepared in step (α), or the catalyst/starter mixture activated in steps (α) and (β), and optionally further starters, and also the monomers and carbon dioxide, are pumped continuously through a tube. When a catalyst/starter mixture prepared in step (α) is used, the second activation stage in step (β) takes place in the first part of the tubular reactor, and the terpolymerization in step (γ) takes place in the second part of the tubular reactor. The molar ratios of the co-reactants vary according to the desired polymer.

In one process variant, carbon dioxide is metered in its liquid or supercritical form, in order to permit optimum miscibility of the components. The carbon dioxide can be introduced at the inlet of the reactor and/or via metering points which are arranged along the reactor, in the reactor. A portion of the monomers may be introduced at the inlet of the reactor. The remaining amount of the monomers is introduced into the reactor preferably via two or more metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. Preferably, the mixing elements mix $CO_2$ which is being metered in and the monomers with the reaction mixture. In an alternative embodiment, different volume elements of the reaction mixture are mixed with one another.

Loop reactors can likewise be used to prepare polyethercarbonate polyols containing double bonds. These generally include reactors having internal and/or external material recycling (optionally with heat exchanger surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("delay tube") in which residual concentrations of free monomers present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture preferably contains less than 0.05 wt % of monomers. The post-reaction time or the residence time in the downstream reactor is preferably 10 min to 24 h, especially preferably 10 min to 3 h.

In a further preferred embodiment of the process for preparing the polyethercarbonate polyols, the temperature in step (γ) may be not less than 60° C. and not more than 150° C. In a particularly preferred embodiment of the process, the temperature in step (γ) may be greater than or equal to 80° C. and less than or equal to 130° C., and very preferably greater than or equal to 90° C. and less than or equal to 120° C. This temperature range during the polymerization has proven particularly suitable for synthesis of the polyethercarbonate polyols containing unsaturated groups with a sufficient reaction rate and with a high selectivity. In the range of lower temperatures, the reaction rate which comes about may only be inadequate, and, at higher temperatures, the fraction of unwanted by-products may increase too greatly. If temperatures are selected that are too high, there may, for example, be premature crosslinking of the unsaturated groups.

The polyethercarbonate polyols containing double bonds that are obtainable in accordance with the invention preferably have an average OH functionality (i.e., average number of OH groups per molecule) of at least 1, preferably of 1.5 to 10, more preferably of ≥2.0 to ≤4.0.

The molecular weight of the resulting polyethercarbonate polyols containing double bonds is preferably at least 400 g/mol, more preferably 400 to 1 000 000 g/mol and most preferably 500 to 60 000 g/mol.

The suspension media which are used in step (α) for suspending the catalyst contain no H-functional groups. Suitable suspension media are any polar aprotic, weakly polar aprotic and nonpolar aprotic solvents, none of which contain any H-functional groups. The suspension media used may also be a mixture of two or more of these suspension media. The following polar aprotic solvents are mentioned here by way of example: 4-methyl-2-oxo-1,3- dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar aprotic and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step ($\alpha$) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydrofuran-2 (3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b] pyridin-5-one, 4-methyl-3,4-dihydro-1H-pyrano [3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de] isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl) oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and β-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of alkylene oxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides are cyclic compounds containing an anhydride group in the ring. Preferred compounds are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalicanhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

OH Group-Reactive Component (B)

In the context of the present invention, an OH-reactive component (B) is understood to mean components which contain OH group-reactive functional groups and can be reacted in polyaddition reactions or polycondensation reactions with polyol component (A) comprising at least one polyethercarbonate polyol (A-1) containing carbon-carbon double bonds to give reaction products. Examples of polycondensation reactions is the formation of polyester polyols by reaction of at least one polycarboxylic acid component, at least one carboxylic anhydride component and/or at least one carbonyl halide component with the polyol component (A). Polyester polyols used may be at least difunctional polyesters, preferably difunctional polyesters.

In one embodiment of the process of the invention, the polyol component (A) is reacted with at least one dicarboxylic acid component, at least one carboxylic anhydride component, phosgene and/or at least one isocyanate-containing compounds (B-1).

In addition, carbonic acid in the context of this invention is likewise a dicarboxylic acid, which can preferably be used as dicarboxylic acid equivalent in the form of dialkyl esters, for example as dimethyl carbonate, or as diaryl esters, for example as diphenyl carbonate.

Preferably, polyester polyols consist of alternating polycarboxylic acid components and polyol components. As polycarboxylic acid components can, for example, oxalic acid, malonic acid, succinic acid, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, suberic acid, nonanedicarboxylic acid, decanedicarboxylic acid, dodecanedicarboxylic acid, tetradecanedicarboxylic acid, hexadecanedicarboxylic acid, 2-methylsuccinic acid, 3,3-diethylglutaric acid, and dimer fatty acids and/or 2,2-dimethylsuccinic acid. Acid sources used may also be the corresponding analogous anhydrides and/or low molecular weight esters.

In a preferred embodiment of the process of the invention, the compound (B) reactive toward OH groups is at least one isocyanate-containing compound (B-1).

Isocyanate-Containing Compound (B-1).

Suitable polyisocyanates of the isocyanate-containing compound (B-1) are the aromatic, araliphatic, aliphatic or cycloaliphatic polyisocyanates known per se to those skilled in the art which may also have iminooxadiazinedione, isocyanurate, uretdione, urethane, allophanate, biuret, urea, oxadiazinetrione, oxazolidinone, acylurea, carbamate and/or carbodiimide structures. These may be employed individually or in any desired mixtures with one another in B.

The aforementioned polyisocyanates are based on diisocyanates or triisocyanates or higher-functional isocyanates known per se to those skilled in the art having aliphatically, cycloaliphatically, araliphatically and/or aromatically bonded isocyanate groups, it being immaterial whether these were produced using phosgene or by phosgene-free processes. Examples of such diisocyanates or triisocyanates or higher-functional isocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4-/2,4,4-trimethyl-1,6-diisocyanatohexane, 1,10-diisocyanatodecane, 1,3- and 1,4-diisocyanatocyclohexane, 1,3- and 1,4-bis(isocyanatomethyl) cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Covestro A G, Leverkusen, D E), 4-isocyanatomethyl-1,8-octane diisocyanate (triisocyanatononane, TIN), ω,ω'-diisocyanato-1,3-dimethylcyclohexane (H$_6$XDI), 1-isocyanato-1-methyl-3-isocyanatomethylcyclohexane, 1-isocyanato-1-methyl-4-isocyanatomethylcyclohexane, bis (isocyanatomethyl)norbornane, naphthalene 1,5-diisocyanate, 1,3- and 1,4-bis(2-isocyanato-prop-2-yl)benzene (TMXDI), 2,4- and 2,6-diisocyanatotoluene (TDI), in particular the 2,4 and the 2,6 isomers and industrial mixtures of the two isomers, 2,4'- and 4,4'-diisocyanatodiphenylmethane (MDI), 1,5-diisocyanatonaphthalene, 1,3-bis(isocyanatomethyl)benzene (XDI) and any desired mixtures of the recited compounds and also polyfunctional isocyanates obtained by dimerization or trimerization or higher oligomerization of the aforementioned isocyanates and comprising isocyanurate rings, iminooxadiazinedione rings, uretdione rings, uretonimine rings and also polyfunctional isocyanates obtained by adduct formation of the recited isocyanates onto mixtures of different polyhydric alcohols, such as TMP, TME or pentaerythritol.

These compounds of the isocyanate-containing compound (B-1) preferably have a content of isocyanate groups of 2% by weight to 60% by weight, preferably of 15% by weight to 50% by weight.

Particular preference is given to using, in isocyanate-containing compound (B-1), polyisocyanates or polyisocyanate mixtures of the aforementioned type having exclusively aliphatically, cycloaliphatic and/or aromatically bonded isocyanate groups.

Most preferably, the isocyanate-containing component (B-1) comprises selected from the group consisting of HDI, MDI, TDI, NDI, the trimerization or higher oligomerization products thereof and/or adducts thereof.

The isocyanate-containing compounds (B-1) of the invention preferably have an average NCO functionality (i.e., average number of NCO groups per molecule) of at least 1, preferably of 1.5 to 10, more preferably of ≥2.0 to ≤4.0.

Free-Radical Initiator (C)

According to the standard technical definition, free-radical initiator is understood to mean chemical compounds which, through thermolytic or photolytic cleavage, form initiators, preferably free radicals, which initialize the free-radical reaction, for example the polymerization or cross-linking.

Peroxide (C-1)

In a preferred embodiment of the process of the invention, peroxides are used. By the generally customary definition, this is understood to mean compounds that contain the peroxide anion ($O_2^{2-}$) or a peroxy group (—O—O—), where the oxygen in these compounds has a formal oxidation number of minus one.

The group of peroxidic compounds may be divided into inorganic and organic peroxides, where the inorganic peroxides often have salt-like character, whereas the organic peroxides bear covalently bonded peroxy groups. The oxygen-oxygen bond of peroxides is labile and tends to homolytic scission to form reactive free radicals.

Examples of inorganic peroxides are hydrogen peroxide, peroxoborates, peroxocarbonates, peroxochlorates, peroxodiphosphates, peroxodiphosphoric acid, peroxodisulfuric acid, peroxodisulfates, peroxodisulfuryl difluoride, peroxohyponitrites, peroxocarbonic acid, peroxonitrates, peroxomolydates, peroxomonophosphates, peroxomonophosphoric acid, peroxonitric acid, peroxomonosulfuric acid, peroxomonosulfates, peroxotungstates Examples of organic peroxides include peresters and hydroperoxide.

In a preferred embodiment of the process of the invention, the at least one peroxide is selected from the group consisting of dibenzoyl peroxide, dilauroyl peroxide, acetylacetone peroxide, cyclohexanone peroxide, methyl ethyl ketone peroxide, methyl isobutyl ketone peroxide, cumene hydroperoxide, tert-butyl hydroperoxide, di(2-tert-butylperoxyisopropyl)benzene, tert-butyl cumyl peroxide, di-tert-amyl peroxide, di-tert-butyl peroxide, dicumyl peroxide, 2,5-dimethyl-2,5-di-(tert-butylperoxy)hexane, 1,1-di(tert-butylperoxy)-3,3,5-trimethylcyclohexane, 1,1-di(tert-butylperoxy) cyclohexane, 2,5-dimethyl-2,5-di(2-ethylhexanoylperoxy) hexane, tert-butyl peroxybenzoate, tert-butyl peroxy-3,5,5-trimethylhexanoate, tert-butyl peroxy-2-ethylhexanoate, tert-butyl monoperoxymaleate, di(4-tert-butylcyclohexyl)

peroxydicarbonate, tert-butyl peroxy-2-ethylhexylcarbonate, tert-butyl peroxyisopropylcarbonate, 1,3 1,4-bis(tert-butylperoxyisopropyl)benzene, t-butyl cumyl peroxide, 2,5-di(t-butylperoxy)-2,5-dimethylhexane, n-butyl 4,4'-di(t-butylperoxy)valerate, 1,1'-di(tert-butylperoxy)-3,3,5-trimethylcyclohexane, di(2,4-dichlorobenzoyl) peroxide, tert-butyl peroxybenzoate, butyl 4,4-di-(tert-butylperoxy) valerate, 2,5-dimethyl-2,5-di(tert-butylperoxy)hex-3-yne, 2,2'-azodiisobutyronitrile and di-tert-butyl peroxide.

In a particularly preferred embodiment of the process of the invention, the at least one peroxide is selected from the group consisting of 1,1'-di-(tert-butylperoxy)-3,3,5-trimethylcyclohexane, di-tert-butyl peroxide, and tert-butyl peroxybenzoate.

Catalyst (D)

For reaction of the polyol component (A) comprising at least one polyethercarbonate polyol (A-1) containing carbon-carbon double bonds with an OH group-reactive component (B) containing at least one compound reactive toward OH groups to give a reaction product, preferably to give a polyurethane, at least one catalyst (D) is added.

In one configuration of the process of the invention, in step i), at least one catalyst (D) for the reaction of the polyol component (A) with an OH group-reactive compound (B), preferably isocyanate-containing component (B-1) containing terminal NCO groups, is added.

Such catalysts (D) are known to those skilled in the art.

Catalysts (D) used are preferably aliphatic tertiary amines (for example trimethylamine, tetramethylbutanediamine, 3-dimethylaminopropylamine, N,N-bis(3-dimethylaminopropyl)-N-isopropanolamine), cycloaliphatic tertiary amines (for example 1,4-diaza[2.2.2]bicyclooctane), aliphatic amino ethers (for example bis(dimethylaminoethyl) ether, 2-(2-dimethylaminoethoxy)ethanol and N,N,N-trimethyl-N-hydroxyethylbisaminoethyl ether), cycloaliphatic amino ethers (for example N-ethylmorpholine), aliphatic amidines, cycloaliphatic amidines, urea, and derivatives of urea (for example aminoalkylureas; see, for example, EP-A 0 176 013, especially (3-dimethylaminopropylamino)urea).

Catalysts (D) used may also be tin(II) salts of carboxylic acids, where the respective parent carboxylic acid preferably has from 2 to 20 carbon atoms. Particular preference is given to the tin(II) salt of 2-ethylhexanoic acid (i.e. tin(II) 2-ethylhexanoate), the tin(II) salt of 2-butyloctanoic acid, the tin(II) salt of 2-hexyldecanoic acid, the tin(II) salt of neodecanoic acid, the tin(II) salt of oleic acid, the tin(II) salt of ricinoleic acid and tin(II) laurate. It is also possible to use tin (IV) compounds, for example dibutyltin oxide, dibutyltin dichloride, dibutyltin diacetate, dibutyltin dilaurate, dibutyltin maleate or dioctyltin diacetate as catalysts (D). It is of course also possible to use all the catalysts (D) mentioned as mixtures.

Catalysts (D) used may also be tin-free organometallic compounds. Examples of these are the customary organic metal compounds that are known in the art, such as titanium compounds, iron compounds, zinc compounds or bismuth compounds. Catalysts (D) used as tin-free organometallic compounds may preferably be hexanoic acid, 2-ethyl-, zinc salt, basic (OMG Borchers GmbH, Langenfeld, Borchi KAT 22), titanium acetylacetonate (Tyzor AA 105), titanium tetrabutoxide (Tyzor TBT), bismuth 2-ethylhexanoate (Borchi KAT 320) and and/or a mixture of bismuth 2-ethylhexanoate and zinc 2-ethylhexanoate (Borchi KAT 0244). It is of course also possible to use all the catalysts (D) mentioned as mixtures.

Further representatives of catalysts (D) to be used and details of the mode of action of the catalysts (D) are described in Vieweg and Höchtlen (eds.): Kunststoff-Handbuch [Plastics Handbook], volume VII, Carl-Hanser-Verlag, Munich 1966, p. 96-102, and Henri Ulrich, "Chemistry and Technology of Isocyanates", John Wiley & Sons, Chichester, New York, Brisbane, Toronto, Singapore, 1996, reprinted in 2001, pages 98ff.

The catalysts (D) are generally used in amounts of about 0.001% to 10% by weight, based on the total amount of compounds having at least two hydrogen atoms reactive toward isocyanates.

In a further embodiment of the process of the invention, step i) is conducted at temperatures of 20° C. to 200° C., preferably of 60° C. to 160° C.

In a further embodiment of the process of the invention, step ii) is conducted at temperatures of 20° C. to 200° C., preferably of 60° C. to 160° C.

The invention further provides an elastomer, preferably a polyurethane-containing elastomer, obtainable or obtained by a process described in the preceding pages.

In a further embodiment, the elastomer, preferably the polyurethane-containing elastomer, is used as rubber, sealing compound, gaskets, adhesive, varnish, or shaped body, for example for dampers, damper elements or hoses.

The invention further provides a two-component system comprising a polyol component (A) comprising at least one polyethercarbonate polyol (A-1) containing carbon-carbon double bonds and an OH group-reactive component (B) comprising at least one compound reactive toward OH groups, wherein the molar ratio of the OH group-reactive groups of the OH group-reactive compound (B), preferably NCO groups of the isocyanate component (B-1), to the OH groups of the polyol component (A) is greater than 1.0, wherein at least one free-radical initiator (C), preferably at least one peroxide (C-1), is present in component (A) and/or component (B). Preferably, the at least one peroxide (C-1) is present in component (A).

In one embodiment of the two-component system, the content of carbon-carbon double bonds in at least one polyethercarbonate polyol (A-1) of the two-component system is from 0.5% by weight to 17.0% by weight, preferably 1.0% by weight to 6.0% by weight.

The content of carbon-carbon carbon-carbon double bonds in the polyethercarbonate polyol for the polyethercarbonate polyol containing carbon-carbon double bonds is found as the quotient of the reported double bond content of the polyethercarbonate polyols used reported in $C_2H_2$ equivalents per unit total mass of the polyethercarbonate polyol, and is reported in $C_2H2$ equivalents per unit mass of polyethercarbonate polyol.

In one embodiment of the two-component system, the at least one catalyst (D) is present in component (A) and/or in component (B), preferably in component (B).

In an alternative embodiment of the invention, a further two-component system comprising a polyol component (A) consists comprising at least one polyethercarbonate polyol (A-1) containing carbon-carbon double bonds and an OH group-reactive component (B) comprising at least one compound reactive toward OH groups, where the molar ratio of the OH group-reactive groups of the OH group-reactive compound (B) of the OH group-reactive compound B, preferably NCO groups of the isocyanate component (B-1), to the OH groups of the polyol component (A) is greater than 1.0, as component 1 and at least one free-radical initiator (C), preferably at least one peroxide (C-1), as component 2.

In one embodiment of the two-component system, the at least one catalyst (D) is present in component 1 and/or in component 2.

In a first embodiment, the invention relates to a process for preparing an elastomer, preferably a polyurethane-containing elastomer, by reacting a polyol component (A) containing at least one polyethercarbonate polyol (A-1) containing carbon-carbon double bonds with an OH group-reactive component (B) containing at least one compound reactive toward OH groups, preferably an isocyanate component (B-1) containing NCO groups, in the presence of a free-radical initiator (C), preferably at least one peroxide (C-1), and optionally of a catalyst (D), wherein the molar ratio of the OH-reactive groups in the OH group-reactive component (B), preferably NCO groups of the isocyanate component (B-1), to the OH groups of the polyol component (A) containing carbon-carbon double bonds is greater than 1.0.

In a second embodiment, the invention relates to a process according to the first embodiment, wherein component (B) reactive toward OH groups is an isocyanate-containing component (B-1).

In a third embodiment, the invention relates to a process according to the first or second embodiment, wherein the free-radical initiator (C) is at least one peroxide (C-1), and the at least one peroxide is selected from the group consisting of dibenzoyl peroxide, dilauroyl peroxide, acetylacetone peroxide, cyclohexanone peroxide, methyl ethyl ketone peroxide, methyl isobutyl ketone peroxide, cumene hydroperoxide, tert-butyl hydroperoxide, di(2-tert-butylperoxyisopropyl)benzene, tert-butyl cumyl peroxide, di-tert-amyl peroxide, di-tert-butyl peroxide, dicumyl peroxide, 2,5-dimethyl-2,5-di-(tert-butylperoxy)hexane, 1,1-di(tert-butylperoxy)-3,3,5-trimethylcyclohexane, 1,1-di(tert-butylperoxy)cyclohexane, 2,5-dimethyl-2,5-di(2-ethylhexanoylperoxy)hexane, tert-butyl peroxybenzoate, tert-butyl peroxy-3,5,5-trimethylhexanoate, tert-butyl peroxy-2-ethylhexanoate, tert-butyl monoperoxymaleate, di(4-tert-butylcyclohexyl) peroxydicarbonate, tert-butyl peroxy-2-ethylhexylcarbonate, tert-butyl peroxyisopropylcarbonate, 1,3 1,4-bis(tert-butylperoxyisopropyl)benzene, t-butyl cumyl peroxide, 2,5-di(t-butylperoxy)-2,5-dimethylhexane, n-butyl 4,4'-di(t-butylperoxy)valerate, 1,1'-di(tert-butylperoxy)-3,3,5-trimethylcyclohexane, di(2,4-dichlorobenzoyl) peroxide, tert-butyl peroxybenzoate, butyl 4,4-di-(tert-butylperoxy)valerate, 2,5-dimethyl-2,5-di(tert-butylperoxy)hex-3-yne, 2,2'-azodiisobutyronitrile and di-tert-butyl peroxide.

In a fourth embodiment, process according to any of the first to third embodiments, wherein the polyethercarbonate polyol (A-1) containing carbon-carbon double bonds has a content of carbon-carbon double bonds of 0.5% by weight to 17.0% by weight, preferably of 1.0% by weight to 6.0% by weight.

In a fifth embodiment, the invention relates to a process according to the first to fourth embodiments, wherein the polyethercarbonate polyol (A-1) containing carbon-carbon double bonds has a $CO_2$ content of 0.5% by weight to 50% by weight, preferably of 5% by weight to 25% by weight.

In a sixth embodiment, the invention relates to a process according to any of the first to fifth embodiments, wherein the polyethercarbonate polyol (A-1) containing carbon-carbon double bonds is obtainable by addition of an alkylene oxide, at least one monomer containing carbon-carbon double bonds and $CO_2$ onto an H-functional starter compound in the presence of a double metal cyanide catalyst.

In a seventh embodiment, the invention relates to a process according to any of the first to sixth embodiments, wherein the monomer containing at least one carbon-carbon double bond is selected from at least one of the monomers from one or more of the groups consisting of (a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, partly epoxidized fats and oils and/or mixtures thereof (b) alkylene oxide with double bond of the general formula (IX):

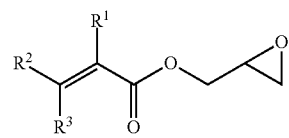

(IX)

where $R_1$ to $R_3$ are independently H, halogen, substituted or unsubstituted C1-C22 alkyl or substituted or unsubstituted C6-C12 aryl (c) cyclic anhydride conforming to the formula (X), (XI) or (XII):

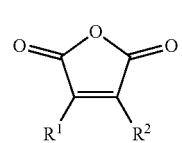

(X)

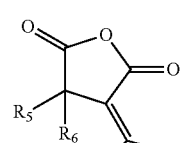

(XI)

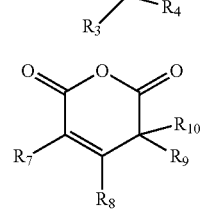

(XII)

where $R_1$ to $R_{10}$ are independently H, halogen, substituted or unsubstituted C1-C22 alkyl or substituted or unsubstituted C6-C12 aryl, and (d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

In an eighth embodiment, the invention relates to a process according to the seventh embodiment, wherein the at least one monomer containing at least one carbon-carbon double bonds is selected from one or more of the groups consisting of (a) allyl glycidyl ether, vinylcyclohexene oxide and limonene oxide, (b) glycidyl acrylate and glycidyl methacrylate, (c) maleic anhydride and itaconic anhydride and (d) 4-cyclohexene-1,2-dioic anhydride and 5,6-norbornene-2,3-dioic anhydride.

In a ninth embodiment, the invention relates to a process according to any of the first to embodiments, wherein as isocyanate-containing component (B) comprises aliphatic, cycloaliphatic and/or aromatic isocyanates, preferably HDI, MDI, TDI, NDI, the trimerization or higher oligomerization products thereof and/or adducts thereof.

In a tenth embodiment, the invention relates to a process according to any of the first to ninth embodiments, any of the preceding claims, comprising the following steps:
i) reacting a polyol component (A) comprising at least one polyethercarbonate polyol (A-1) containing carbon-carbon double bonds with an OH group-reactive component (B) containing at least one compound reactive toward OH groups, preferably an isocyanate component (B-1) containing NCO groups, to give a reaction product, preferably to give a polyurethane, optionally in the presence of a catalyst (D),
ii) crosslinking the reaction product obtaining in i), preferably the polyurethane, in the presence of at least one free-radical initiator (C), preferably at least one peroxide (C-1).

In an eleventh embodiment, the invention relates to a process according to the tenth embodiment, wherein, in step i), at least one catalyst (D) for the reaction of the polyol component (A) with an OH group-reactive compound (B), preferably isocyanate-containing component (B-1) containing terminal NCO groups, is added.

In a twelfth embodiment, the invention relates to a process according to the tenth or eleventh embodiment, wherein in step i) is conducted at temperatures of 20° C. to 200° C., preferably of 60° C. to 160° C.

In a thirteenth embodiment, the invention relates to a process according to any of the tenth to twelfth embodiments, wherein in step ii) is conducted at temperatures of 20° C. to 200° C., preferably of 60° C. to 160° C.

In a fourteenth embodiment, the invention relates to a process according to any of the first to ninth embodiments, comprising the following steps:
(iii) reacting a polyol component (A) comprising at least one polyethercarbonate polyol (A-1) containing carbon-carbon double bonds with at least one free-radical initiator (C), preferably at least one peroxide (C-1),
(iv) reacting the product obtaining in step (iii) with an OH group-reactive component (B) comprising at least one compound reactive toward OH groups, preferably an isocyanate component (B-1) containing NCO groups, optionally in the presence of a catalyst (D).

In a fifteenth embodiment, the invention relates to an elastomer, preferably polyurethane-containing elastomer, obtainable or obtained by a process according to any of the first to fourteenth embodiments.

In a sixteenth embodiment, the invention relates to the use of the elastomer, preferably the polyurethane-containing elastomer, according to the fifteenth embodiment, wherein the elastomer, preferably the polyurethane-containing elastomer, is used as rubber, sealing compound, gaskets, adhesive, varnish, or shaped body, for example for dampers, damper elements or hoses.

In a seventeenth embodiment, the invention relates to a two-component system comprising a polyol component (A) comprising at least one polyethercarbonate polyol (A-1) containing carbon-carbon double bonds and an OH group-reactive component (B) comprising at least one compound reactive toward OH groups, wherein the molar ratio of the OH group-reactive groups of the OH group-reactive compound (B), preferably NCO groups of the isocyanate component (B-1), to the OH groups of the polyol component (A) is greater than 1.0, wherein at least one free-radical initiator (C), preferably at least one peroxide (C-1), is present in component (A) and/or component (B).

In an eighteenth embodiment, the invention relates to a two-component system according to the seventeenth embodiment, wherein at least one catalyst (D) is present in component (A) and/or in component (B).

In a nineteenth embodiment, the invention relates to a process according to the eighth embodiment, wherein the at least one monomer containing carbon-carbon double bonds is maleic anhydride.

EXAMPLES

The present invention is described in detail by the examples which follow, but without being restricted thereto.
Feedstocks
H-Functional Starter Compounds
Glycerol: Sigma Aldrich, purity 99.5%
Alkylene Oxides
PO: propylene oxide from Chemgas, purity >99%
Anhydrides
MA: maleic anhydride from Sigma Aldrich, purity >99%
Isocyanate Component (B-1)
MDI trimer isocyanate: Desmodur® VL R 10, NCO content: 31.7 (Covestro AG, Leverkusen)
Further Chemicals
   cPC: 4-methyl-2-oxo-1,3-dioxolane (cPC), 98%, Acros Chemicals
   $H_3PO_4$: phosphoric acid ($H_3PO_4$), 85%, aqueous solution, Fluka
DMC Catalyst
DMC: The DMC catalyst used in all examples was DMC catalyst prepared according to example 6 in WO 2001/80994 A1.
Peroxide (C-1)
Peroxide: 1,1'-di(tert-butylperoxy)-3,3,5-trimethylcyclohexane, 75% sol. in arom. free min. spirit (Acros Organics, Geel, Belgium)
Catalyst (D)
Borchi KAT 22: (hexanoic acid, 2-ethyl-, zinc salt, basic) (OMG Borchers GmbH, Langenfeld)
Methods The polyethercarbonate polyols used were chemically characterized by $^1$H NMR spectroscopy. For this purpose, a sample of the purified reaction mixture was dissolved in each case in deuterated chloroform and measured on a Bruker spectrometer (AV400, 400 MHz).

The terpolymerization of propylene oxide, at least two unsaturated compounds and $CO_2$ results not only in the cyclic propylene carbonate but also in the polyether carbonate polyol having unsaturated groups, comprising firstly polycarbonate units shown in formula (VIIIa)

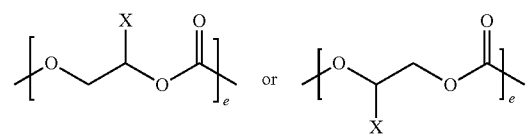

(XIIIa)

and secondly polyether units shown in formula (XIIIb):

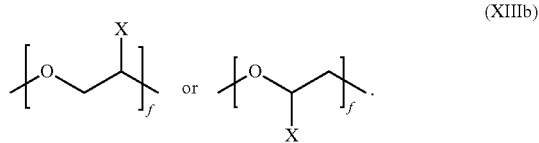
(XIIIb)

The ratio of the amount of cyclic propylene carbonate to polyethercarbonate polyol (selectivity; ratio g/e) and also the fraction of unreacted monomers (propylene oxide $R_{po}$, allyl glycidyl ether $A_{double\ bond}$ in mol %, maleic anhydride $B_{double\ bond}$ in mol %) were determined by means of $^1$H-NMR spectroscopy.

The relevant resonances in the $^1$H NMR spectrum (based on TMS=0 ppm) which were used for integration are summarized in table 1:

TABLE 1

Resonances in the $^1$H NMR spectrum

| Signal | Shift in ppm | Designation | Area corresponds to number of H atoms |
|---|---|---|---|
| I1 | 1.10-1.17 | CH$_3$ group of the polyether units | 3 |
| I2 | 1.25-1.34 | CH$_3$ group of the polycarbonate units | 3 |
| I3 | 1.45-1.48 | CH$_3$ group of the cyclic carbonate | 3 |
| I4 | 2.95-3.00 | CH groups of the free propylene oxide not consumed by reaction | 1 |
| I6 | 6.22-6.29 | CH group of the double bond obtained in the polymer via the incorporation of maleic anhydride | 2 |
| I7 | 7.03-7.04 | CH group for free maleic anhydride not consumed by reaction | 2 |

The figure reported is the molar ratio of the amount of cyclic propylene carbonate to carbonate units in the polyether carbonate polyol (selectivity g/e) and the molar ratio of carbonate groups to ether groups in the polyether carbonate polyol (c/f), and also the fractions of the unreacted propylene oxide (in mol %) and maleic anhydride (in mol %).

Taking account of the relative intensities, the values were calculated as follows:
Molar ratio of the amount of cyclic propylene carbonate to carbonate units in the polyether carbonate polyol (selectivity g/e):

$$g/e = I3/I2$$

Molar ratio of carbonate groups to ether groups in the polyethercarbonate polyol (e/f):

$$e/f = I2/I1$$

The proportion of carbonate units ($C'_{carbonate}$ in mol %) in the repeat units of the polyetherestercarbonate polyol obtained from the terpolymerization of propylene oxide, maleic anhydride and $CO_2$:

$$C'_{carbonate}(\text{mol \%}) = [(I2/3)/((I1/3)+(I2/3)+(I6/2))] \times 100\%$$

The proportion of carbonate units ($C'_{carbonate}$ in % by weight) in the repeat units of the polyethercarbonate polyol obtained from the terpolymerization of propylene oxide, allyl glycidyl ether and $CO_2$:

$$C'_{carbonate}(\text{\% by weight}) = [(I2/3)*44/((I1/3)*58+(I2/3)*102+(I5)*98)] \times 100\%$$

The proportion of the double bonds which result via the incorporation of the maleic anhydride ($B_{double\ bond}$ in mol %) in the repeat units of the polyetherestercarbonate polyol:

$$B_{double\ bond}(\text{mol \%}) = [(I6/2)/((I1/3)+(I2/3)+(I6/2))] \times 100\%$$

The proportion of carbon-carbon double bonds ($B_{double\ bond}$ in % by weight) in the repeat units of the polyethercarbonate polyol obtained from the terpolymerization of propylene oxide, allyl glycidyl ether and $CO_2$:

$$B_{double\ bond}(\text{\% by weight}) = [(I2/3)*44/((I1/3)*58+(I2/3)*102+(I5)*98)] \times 100\%$$

The molar proportion of the unconverted propylene oxide ($R_{PO}$ in mol %) based on the sum total of the amount of propylene oxide used in the activation and the copolymerization, calculated by the formula:

$$R'_{PO} = [(I4)/((I1/3)+(I2/3)+(I3/3)+(I4)+(I6/2)+(I7/2))] \times 100\%$$

The molar proportion of the unconverted maleic anhydride ($R_{MA}$ in mol %) based on the sum total of the amount of maleic anhydride used in the activation and the copolymerization is calculated by the formula:

$$R_{MA} = [(I7/2)/((I1/3)+(I2/3)+(I3/3)+(I4)+(I6/2)+(I7/2))] \times 100\%$$

The number-average $M_n$ and the weight-average $M_w$ molecular weights of the polyethercarbonate polyols used were determined by means of gel permeation chromatography (GPC). The procedure was that of DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.

The OH number (hydroxyl number) was determined in a method based on DIN 53240-2, but using pyridine instead of THF/dichloromethane as solvent. A 0.5 molar ethanolic KOH solution was used for titration (endpoint recognition by potentiometry). The test substance used was castor oil with certified OH number. The unit expressed as "mg/g" relates to mg[KOH]/g[eq. polyether carbonate polyol].

Tensile testing according to DIN 53504-S2 standard with an S2 test specimen was effected at room temperature at a testing speed of 200 mm/min. In addition, a tensile test according to DIN 53504-S2 standard with an S2 test specimen was conducted at 80° C. at a testing speed of 200 mm/min. For the determination of the standard deviation, for each measurement point, 5 test specimens were each taken from a conditioned sheet and tested.

The Shore A hardness of the elastomers was determined in accordance with DIN 53505. For this purpose, cylindrical test specimens (diameter 32 mm, height 40 mm) were produced at 80° C. for 30 minutes. Subsequently, the test specimens were conditioned at 130° C. for one hour and then tested. For the determination at elevated temperature, the test specimens were conditioned in an air circulation oven at 80° C. for 2 h and then tested directly. For the determination of the standard deviation, for each measurement point, 5 test specimens were each taken from a conditioned sheet and tested.

In order to determine the thermal cycling stability of the elastomer, flat sheets were produced in the process already described and cured at 80° C. The sheets were then not conditioned and the test specimens (DIN 53504-S2) were taken directly. Subsequently, the test specimens were subjected to a defined temperature profile in a climate-controlled chamber. This involved heating them from room temperature to 160° C. within 20 minutes and keeping them at that temperature for 15 minutes. Subsequently, the samples were cooled down to −40° C. within 50 minutes and kept in turn at that temperature for 15 minutes, before they were heated again to room temperature within 20 minutes. This temperature cycle was run three times in total and, after the third cycle had ended, two test specimens in total were taken and tested in the tensile test according to DIN 53504. 5 specimens were examined for the determination of the standard deviation.

Preparation of the Polyethercarbonate Polyols (A-1) containing Carbon-Carbon Double Bonds A-1-1: Preparation of the Polyethercarbonate Polyol containing Carbon-Carbon Double Bonds Step (α): 1st Activation Stage A nitrogen-purged 60 L pressure reactor comprising a gas metering unit (gas inlet tube) was initially charged with a suspension of 11:3 g of DMC and 3000 g of cyclic propylene carbonate (cPC). The reactor was heated to about 100° C. and inertized with $N_2$ at a pressure $p_{abs}$=100 mbar for 1 h.

Step (α): 2nd Activation Stage

The reactor was then adjusted to a pressure of 25 bar with $CO_2$. 600 g of propylene oxide (PO) were metered into the reactor at 110° C. while stirring (316 rpm) within 2 min. The start of the reaction was signaled by a temperature spike ("hotspot") and a pressure drop.

Step (γ): Polymerization Stage with Continuous Metered Addition of the Starter Alcohol On completion of activation, 23.15 kg of propylene oxide at 6.0 kg/h, 1.45 kg of glycerol (additized with 160 ppm $H_3PO_4$) and 16.62 kg of a 30 wt % MA-cPC mixture at 4.82 kg/h were metered simultaneously into the reactor. The reaction temperature was lowered here to 105° C. In addition, $CO_2$ was metered in such that the pressure of 25 bar was kept constant. After the metered addition had ended, the mixture was stirred for about another 30 min. The cyclic propylene carbonate was separated from the polyether carbonate polyol in a thin-film evaporator (T=140° C., $P_{abs}$<3 mbar, 400 rpm). This experiment was repeated and the mixed batch was analyzed by means of GPC, NMR and OHN.

In table 2 are analytical data for the resulting double bond-containing polyethercarbonate polyol (content of $CO_2$ incorporated, content of double bond incorporated; molecular weight (Mn), polydispersity and hydroxyl number (OHN)).

A-1-2: Preparation of the Polyethercarbonate Polyol Containing Carbon-Carbon Double Bonds The preparation was effected analogously to example 1 (PEC-1) except that the reaction pressure was 75 bar. In addition, 20.26 kg of propylene oxide at 5.4 kg/h, 1.45 kg of glycerol (additized with 160 ppm $H_3PO_4$) and 16.62 kg of a 30 wt % MA/cPC mixture at 4.82 kg/h were metered in.

Table 2 content of $CO_2$ incorporated, content of double bond incorporated (DB); molecular weight (Mn), polydispersity and hydroxyl number (OHN). Of the polyethercarbonate polyols A-1-1 and A-1-2 containing double bonds and of the polyol mixture A-1-4 by mixing the polyethercarbonate polyols A-1-1 and A-1-2 containing carbon-carbon double bonds.

| Polyethercarbonate polyol/ polyol mixture | CO2 [% by wt.] | DB [% by wt.] | Mn [g/mol] | PDI | OHN [mg/g] |
|---|---|---|---|---|---|
| A-1-1 | 7.3 | 4.4 | 2127 | 1.28 | 93.0 |
| A-1-2 | 12.1 | 4.5 | 2170 | 1.23 | 82.4 |
| A-1-3[a)] | 9.7[b)] | 4.5[b)] | 2149[b)] | 1.26[b)] | 87.7[b)] |

[a)]Polyol mixture A-1-3 was prepared by physical mixing of 50% by weight of A-1-1 and 50% by weight of A-1-2.

[b)]The values shown for A-1-3 were calculated in each case from the arithmetic average for polyethercarbonate polyols A-1-1 and A-1-2 according to the proportion by mass.

A-1-4 to A-1-17: Preparation of Polyethercarbonate Polyols Containing Carbon-Carbon Double Bonds Step (α): 1st Activation Stage The DMC catalyst in unactivated form was suspended in 4-methyl-2-oxo-1,3-dioxolane (cPC) in a 1 L pressure reactor with a gas metering device. The suspension was then heated to 130° C., stirred at 1200 rpm and introduced with 26-30 L/h of nitrogen over the course of 30 min and, at the same time, a reduced pressure of 75-100 mbar was applied.

Step (α): 2nd Activation Stage

In the pressure reactor, at 130° C., 1200 rpm and at a supply pressure of around 100 mbar established with nitrogen, an amount of 10 g of the mixture of propylene oxide (PO) and maleic anhydride (MA) was added all at once. After 10 minutes, the addition of 10 g of PO and MA was repeated. The onset of the reaction was perceptible by a temperature peak ("hotspot") and by a pressure drop to the starting pressure. After the first pressure drop, the reactor was pressurized to 25 bar with $CO_2$ and then a further 10 g of the PO/MA mixture were added all at once for activation. After a delay, there was another temperature peak and the total pressure in the reactor showed a pressure decrease.

Step (γ): Polymerization Stage with Continuous Metered Addition of the Starter Alcohol On completion of activation, the PO/MA mixture and the glycerol starter alcohol were metered continuously (and simultaneously) into the reactor. At the same time, the reaction temperature was lowered from 130° C. at about 1° C./min to 110° C. The progression of the reaction was observed from the $CO_2$ consumption while keeping the pressure in the reactor constant at 25 bar by continuously regulated further metered addition of $CO_2$. After addition of MA/PO had ended, stirring was continued (1200 rpm) at 105-110° C. and reaction pressure until abatement of $CO_2$ consumption and the end of the day of the experiment.

Workup and Analysis:

The product mixture obtained was freed of traces of PO by means of a rotary evaporator and analyzed by means of NMR and GPC as described. Subsequently, cPC was removed from the product by means of thin-film evaporation (0.1 mbar, 140° C.).

The starting weights, metering rates and analysis of the resulting polyols from working examples A-1-4 to A-1-17 can be found in table 3.

TABLE 3

Molar amounts used, metering rates and the analysis of the polyethercarbonate polyols A-1-4 to A-1-17 containing carbon-carbon double bonds:

| | Molar amounts used | | | Metering rates PO/MA | | Analysis of resulting polyol | | | |
|---|---|---|---|---|---|---|---|---|---|
| A-1- | DMC [mg] | cPC [g] | Σm(PO/MA) [g][a)] | Glycerol[b)] [g] | mixture [g/min] | Glycerol [g/min] | $CO_2$[c)] [% by wt.] | $DB$[d)] [% by wt.] | Mn (GPC) [g/mol] | PDI (GPC) [g/mol] |
| 4 | 329.7 | 49.8 | 660 | 35.35 | 2.65 | 0.167 | 6.6 | 4.0 | 2044 | 1.39 |
| 5 | 330.1 | 49.8 | 666 | 35.35 | 2.67 | 0.172 | 4.2 | 4.3 | 2051 | 1.84 |
| 6 | 329.6 | 49.7 | 640 | 35.35 | 2.63 | 0.177 | 4.9 | 4.3 | 2096 | 1.46 |
| 7 | 400.1 | 50.2 | 640 | 35.35 | 2.68 | 0.172 | 5.2 | 4.4 | 2018 | 1.21 |
| 8 | 399.0 | 49.7 | 640 | 35.35 | 2.67 | 0.168 | 4.5 | 4.4 | 2075 | 1.28 |
| 9 | 400.0 | 50.0 | 640 | 35.35 | 2.68 | 0.178 | 3.6 | 4.4 | 2031 | 1.26 |
| 10 | 400.0 | 50.0 | 640 | 35.35 | 2.49 | 0.17 | 4.2 | 4.3 | 2085 | 1.59 |
| 11 | 399.0 | 49.9 | 640 | 35.35 | 2.67 | 0.168 | 4.5 | 4.4 | 2058 | 1.27 |
| 12 | 399.5 | 49.9 | 640 | 35.35 | 2.67 | 0.178 | 5.8 | 4.3 | 2014 | 1.25 |
| 13 | 399.7 | 49.9 | 640 | 35.35 | 2.68 | 0.172 | 4.7 | 4.3 | 2139 | 1.49 |
| 14 | 399.3 | 49.7 | 640 | 35.35 | 2.67 | 0.177 | 4.1 | 4.4 | 2148 | 1.41 |
| 15 | 400.0 | 50.0 | 640 | 35.35 | 2.67 | 0.172 | 5.1 | 4.4 | 2087 | 1.23 |
| 16 | 399.8 | 49.6 | 640 | 35.35 | 2.68 | 0.18 | 4.2 | 4.3 | 2056 | 1.69 |
| 17 | 400.0 | 50.1 | 640 | 35.35 | 2.65 | 0.187 | 5.9 | 4.1 | 2445 | 1.39 |

[a)]Total mass of the PO/MA mixture with 17.1 wt % MA based on the mass of MA + PO.
[b)]The glycerol used was additized with $H_3PO_4$ (18 mg of 85% aqueous phosphoric acid were added to 200 g of glycerol).
[c)]$CO_2$ in the form of carbonate units in the product polyol by $^1H$ NMR in wt %.
[d)]Double bond content (DB) in the product polyol by $^1H$ NMR in wt %.

A-1-18: Preparation of Polyol Mixture A-1-18 by Mixing of the Polyethercarbonate Polyols A-1-4 to A-1-17 Containing Carbon-Carbon Double Bonds Table 4 summarizes the preparation of the polyol mixture A-1-18.

TABLE 4

Polyol mixture A-1-18 was prepared by physical mixing of the masses m or proportions by weight w of A-1-4 to A-1-17.

| | A-1- | | | | | | | | | | | | | |
|---|---|---|---|---|---|---|---|---|---|---|---|---|---|---|
| | 4 | 5 | 6 | 7 | 8 | 9 | 10 | 11 | 12 | 13 | 14 | 15 | 16 | 17 |
| m [g] | 566.2 | 598.5 | 592.8 | 598.9 | 588.0 | 585.1 | 575.6 | 576.4 | 577.4 | 598.7 | 554.6 | 360.8 | 588.4 | 1210.4 |
| w [% by wt.] | 6.61 | 6.98 | 6.92 | 6.99 | 6.86 | 6.83 | 6.72 | 6.72 | 6.74 | 6.98 | 6.47 | 4.21 | 6.86 | 14.12 |

TABLE 5

Average C-C double bond content, average CO2 content of 4.8% by weight (calculated via the mass balance) and the experimentally determined hydroxyl number (OHN) of the polyol mixture A-1-18.

| Polyol mixture A-1 | CO2 [% by wt.] | DB [% by wt.] | OHN [mg/g] |
|---|---|---|---|
| A-1-18 | 4.8 | 4.3 | 93.8 |

Preparation of the Polyurethane-Containing Elastomers 300.00 g of the polyethercarbonate polyol mixture A-1-3 containing carbon-carbon double bonds (examples 1 to 4) or A-1-18 (examples 5 to 8) were degassed at an absolute pressure of about 50 mbar at 60° C. for 60 minutes. Subsequently, the amounts of the preheated MDI trimer specified in table 6 as component (B-1), optionally 3 g of 1,1'-di(tert-butylperoxy)-3,3,5-trimethylcyclohexane, 75% sol. in arom. free min. spirit) as peroxide (C-1) were mixed with 0.15 g of Borchi KAT 22 (hexanoic acid, 2-ethyl-, zinc salt, basic) (OMG Borchers GmbH, Langenfeld) as catalyst (D) in a 700 mL polypropylene beaker (PP beaker) with a wooden splint.

Subsequently, the homogeneous mixture was injected by means of a pressure vessel into a steel mold with liquid temperature control. The steel mold was heated isothermally to 80° C. On completion of filling of the cavity (300 mm*150 mm*2 mm), the mixture was crosslinked under a constant local hold pressure of 6 bar for 30 minutes.

Finally, the sheet was demolded. The cured sheet was subjected to thermal treatment in an air circulation oven at 130° C. for 75 min.

TABLE 6

Amounts of the polyethercarbonate polyol mixtures (A-1-3) and (A-1-18) containing carbon-carbon double bonds used with the isocyanate component (B-1), the peroxide (C-1) and the catalyst (D) used for production of the polyurethane-containing elastomers in examples 1-8.

| Example[a)] | m(A-1-3)[b)] [g] | m(A-1-18)[c)] [g] | m(B-1) [g] | m(C-1) [g] | m(D) [g] | n(iso)/n(OH)[d)] [mol/mol] |
|---|---|---|---|---|---|---|
| 1 (comp.) | 300.00 | — | 62.42 | — | 0.15 | 1.0 |
| 2 (comp.) | 300.00 | — | 62.42 | 3.00 | 0.15 | 1.0 |
| 3 (comp.) | 300.00 | — | 93.63 | — | 0.15 | 1.5 |
| 4 | 300.00 | — | 93.63 | 3.00 | 0.15 | 1.5 |
| 5 (comp.) | — | 300.00 | 66.46 | — | 0.15 | 1.0 |

TABLE 6-continued

Amounts of the polyethercarbonate polyol mixtures (A-1-3) and (A-1-18) containing carbon-carbon double bonds used with the isocyanate component (B-1), the peroxide (C-1) and the catalyst (D) used for production of the polyurethane-containing elastomers in examples 1-8.

| Example[a] | m(A-1-3)[b] [g] | m(A-1-18)[c] [g] | m(B-1) [g] | m(C-1) [g] | m(D) [g] | n(iso)/n(OH)[d] [mol/mol] |
|---|---|---|---|---|---|---|
| 6 (comp.) | — | 300.00 | 66.46 | 3.00 | 0.15 | 1.0 |
| 7 (comp.) | — | 300.00 | 99.68 | — | 0.15 | 1.5 |
| 8 (comp.) | — | 300.00 | 99.68 | 3.00 | 0.15 | 1.5 |

[a](comp. comparative example).
[b]polyol mixture A-1-3 was prepared by physical mixing of 50% by weight of A-1-1 and 50% by weight of A-1-2.
[c]polyol mixture A-1-18 was prepared according to table 4.
[d]molar ratio of the NCO groups of isocyanate component (B-1) to the OH groups of the polyethercarbonate polyol mixture (A-1-4) or (A-1-18) containing carbon-carbon double bonds Tensile Tests for Elastomers according to Examples 1 to 4 at Room Temperature and 80° C. and Shore A Hardnesses

TABLE 7

Results of the tensile tests at room temperature and Shore A hardnesses

| Example | 1 (comp.) | 2 (comp.) | 3 (comp.) | 4 |
|---|---|---|---|---|
| Breaking stress [MPa] | 5.24 ± 0.47 | 5.46 ± 0.41 | 11.89 ± 0.81 | 16.97 ± 2.07 |
| Elongation at break [%] | 153.18 ± 8.54 | 127.42 ± 5.41 | 151.58 ± 4.65 | 131.79 ± 8.92 |
| Shore A | 62.68 ± 2.51 | 69.90 ± 1.01 | 81.57 ± 0.59 | 84.69 ± 0.37 |

TABLE 8

Results of the tensile tests at 80° C. and Shore A hardnesses

| Example | 1 (comp.) | 2 (comp.) | 3 (comp.) | 4 |
|---|---|---|---|---|
| Breaking stress [MPa] | 1.87 ± 0.39 | 3.32 ± 0.28 | 1.86 ± 0.31 | 3.44 ± 0.47 |
| Elongation at break [%] | 47.11 ± 10.96 | 55.95 ± 5.37 | 44.78 ± 7.38 | 49.66 ± 8.48 |
| Shore A | 63.90 ± 1.32 | 69.64 ± 0.78 | 72.91 ± 0.57 | 74.79 ± 0.93 |

The data from the tensile tests at room temperature in table 7 clearly show the synergistic effect of an excess of isocyanate in combination with the use of peroxides (in inventive example 4, i.e. the crosslinking of the reactive double bond). Thus, there is at first no increase in breaking stress through the crosslinking of the double bond. The elongation at break and hardness measurement results demonstrate that crosslinking has taken place. This also becomes clear when behavior at elevated temperature (80° C.) in table 8 is considered, since the effect of the excess of isocyanate here, as a result of the severing of secondary isocyanate bonds, can be neglected and only the peroxide-crosslinked samples have high elongation at break. If testing is effected with an excess of isocyanate (examples 3 and 4) at room temperature, the test specimens have a distinctly higher elongation at break than the stoichiometric samples (examples 1 and 2). However, the higher elongation at break of 5.24 MPa in comparative example 1 to 11.89 MPa in comparative example 3 is attained at the same elongation. The crosslinking of the double bonds, which has no effect on breaking stress without excess isocyanate in comparative example 2, in the case of an excess of isocyanate in inventive example 4, now contributes to a further distinct increase in elongation at break.

Thermal Cycling Stability Studies for Elastomers according to Examples 5 to 8

TABLE 9

Results of tensile tests prior to the study of thermal cycling test stability

| Elastomer | 5 (comp.) | 6 (comp.) | 7 (comp.) | 8 |
|---|---|---|---|---|
| Breaking stress [MPa] | 2.00 ± 0.01 | 1.08 ± 0.02 | 5.39 ± 0.32 | 5.31 ± 0.48 |
| Elongation at break [%] | 69.44 ± 1.32 | 62.34 ± 0.34 | 88.43 ± 3.90 | 90.32 ± 0.98 |

The cycle of thermal cycling stability shown in table 9 shows that the attainment of the maximum temperature of 160° C. and the hold time achieves an effect similar to heat treatment. Sufficient activation energy is thus provided for the activation of double bond crosslinking via the peroxides.

The experiments once again show the effect of the isocyanate excess. Both the stoichiometric mixture (example 5) and the stoichiometric mixture with peroxide (example 6) have comparably low values for breaking stress and reduced values for elongation at break at RT. Addition of excess isocyanate with (example 7) and without peroxide (example 8) increases breaking stress and elongation at break. No effect of the peroxide is observed without the heat treatment operation or the triggering of a second crosslinking stage via the double bonds of the polyol.

TABLE 10

Results from the tensile tests after 3 cycles of thermal cycling test stability:

| Elastomer | 5 (comp.) | 6 (comp.) | 7 (comp.) | 8 |
|---|---|---|---|---|
| Breaking stress [MPa] | 0.91 ± 0.01 | 4.27 ± 0.40 | 5.44 ± 0.12 | 17.07 ± 0.14 |
| Elongation at break [%] | 86.20 ± 4.79 | 75.18 ± 4.83 | 103.27 ± 1.50 | 95.57 ± 0.23 |

After running through three thermal cycling test cycles, the samples with peroxide (examples 6 and 8), according to table 10, have a significant improvement in tensile properties, whereas the samples without peroxide (examples 5 and 7) are comparable to the starting state. In the case of the stoichiometric samples with peroxide in comparative example 6, breaking stress has been increased from 1.08 MPa to 4.27 MPa (~factor of 4) with a simultaneously small rise in elongation at break. In inventive example 8 for elastomers prepared with an isocyanate excess and peroxide, breaking stress is increased from 5.31 MPa to 17.07 MPa (~factor of 3.2), with a rising elongation at break. Comparison of the stoichiometric samples with peroxide, the isocyanate excess samples without peroxide in comparative example 7 and the samples with an isocyanate excess and peroxide clearly shows the synergistic effect of the addition of peroxide in conjunction with an isocyanate excess for elastomers in inventive example 8.

The invention claimed is:
1. A process for preparing an elastomer, comprising:
   i) reacting (A) a polyol component comprising (A-1) at least one polyethercarbonate polyol containing carbon-carbon double bonds with (B) an OH group-reactive component containing at least one compound reactive toward OH groups, to give a reaction product, optionally in the presence of (D) a catalyst, and ii) crosslinking the reaction product obtained in i), in the presence of (C) at least one free-radical initiator, wherein the molar ratio of the OH-reactive groups in the OH group-reactive component (B) to the OH groups of the polyol component (A) containing carbon-carbon double bonds is greater than 1.0.

2. The process as claimed in claim 1, wherein component (B) which comprises at least one compound reactive toward OH groups is (B-1) an isocyanate-containing component.

3. The process as claimed in claim 1, wherein (C) the free-radical initiator comprises (C1) at least one peroxide initiator which comprises at least one of dibenzoyl peroxide, dilauroyl peroxide, acetylacetone peroxide, cyclohexanone peroxide, methyl ethyl ketone peroxide, methyl isobutyl ketone peroxide, cumene hydroperoxide, tert-butyl hydroperoxide, di(2-tert-butylperoxyisopropyl)benzene, tert-butyl cumyl peroxide, di-tert-amyl peroxide, di-tert-butyl peroxide, dicumyl peroxide, 2,5-dimethyl-2,5-di-(tert-butylperoxy)hexane, 1,1-di(tert-butylperoxy)-3,3,5-trimethylcyclohexane, 1,1-di(tert-butylperoxy)cyclohexane, 2,5-dimethyl-2,5-di(2-ethylhexanoylperoxy)-hexane, tert-butyl peroxybenzoate, tert-butyl peroxy-3,5,5-trimethylhexanoate, tert-butyl peroxy-2-ethylhexanoate, tert-butyl monoperoxymaleate, di(4-tert-butylcyclohexyl) peroxydicarbonate, tert-butyl peroxy-2-ethylhexylcarbonate, tert-butyl peroxyisopropylcarbonate, 1,3 1,4-bis(tert-butylperoxyisopropyl)benzene, t-butyl cumyl peroxide, 2,5-di(t-butylperoxy)-2,5-dimethylhexane, n-butyl 4,4'-di(t-butylperoxy)valerate, 1,1'-di(tert-butylperoxy)-3,3,5-trimethyl-cyclohexane, di(2,4-dichlorobenzoyl) peroxide, tert-butyl peroxybenzoate, butyl 4,4-di-(tert-butylperoxy)valerate, 2,5-dimethyl-2,5-di(tert-butylperoxy)-hex-3-yne, 2,2'-azodiisobutyronitrile, and di-tert-butyl peroxide.

4. The process as claimed in claim 1, wherein (A-1) the polyethercarbonate polyol containing carbon-carbon double bonds has a content of carbon-carbon double bonds of 0.5% by weight to 17.0% by weight.

5. The process as claimed in claim 1, wherein (A-1) the polyethercarbonate polyol containing carbon-carbon double bonds has a $CO_2$ content of 0.5% by weight to 50% by weight.

6. The process as claimed in claim 1, wherein (A-1) the polyethercarbonate polyol containing carbon-carbon double bonds is obtained by addition of an alkylene oxide, at least one monomer containing carbon-carbon double bonds and $CO_2$ onto an H-functional starter compound in the presence of a double metal cyanide catalyst.

7. The process as claimed in claim 6, wherein the monomer containing at least one carbon-carbon double bond comprises at least one of the monomers comprising (a) allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids, partly epoxidized fats and oils and/or mixtures thereof;

(b) alkylene oxide with double bond of the general formula (IX):

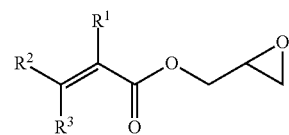

wherein $R_1$ to $R_3$ are independently hydrogen, halogen, substituted $C_1$-$C_{22}$ alkyl, unsubstituted $C_1$-$C_{22}$ alkyl, substituted $C_6$-$C_{12}$ aryl, or unsubstituted $C_6$-$C_{12}$ aryl;

(c) cyclic anhydride which correspond to the formula (X), (XI) or (XII):

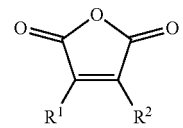

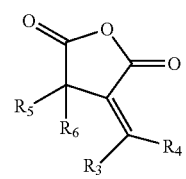

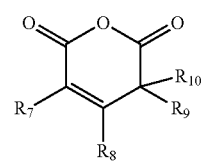

wherein $R_1$ to $R_{10}$ are independently hydrogen, halogen, substituted $C_1$-$C_{22}$ alkyl, unsubstituted $C_1$-$C_{22}$ alkyl, substituted $C_6$-$C_{12}$ aryl, or unsubstituted $C_6$-$C_{12}$ aryl; and (d) 4-cyclohexene-1,2-dioic anhydride, 4-methyl-4-cyclohexene-1,2-dioic anhydride, 5,6-norbornene-2,3-dioic anhydride, allyl-5,6-norbornene-2,3-dioic anhydride, dodecenylsuccinic anhydride, tetradecenylsuccinic anhydride, hexadecenylsuccinic anhydride and octadecenylsuccinic anhydride.

8. The process as claimed in claim 7, wherein the at least one monomer containing at least one carbon-carbon double bonds comprises at least one of (a) allyl glycidyl ether, vinylcyclohexene oxide and limonene oxide, (b) glycidyl acrylate and glycidyl methacrylate, (c) maleic anhydride and itaconic anhydride, and (d) 4-cyclohexene-1,2-dioic anhydride and 5,6-norbornene-2,3-dioic anhydride.

9. The process as claimed in claim 2, wherein (B-1) the isocyanate-containing component comprises at least one of an aliphatic, a cycloaliphatic and/or an aromatic isocyanate.

10. The process as claimed in claim 1, wherein, in step i), at least one catalyst (D) for the reaction of the polyol component (A) with an OH group-reactive compound (B), is added.

11. An elastomer obtained by the process as claimed in claim 1.

12. Rubber, a sealing compound, a gasket, an adhesive, a varnish, or a shaped body which comprises the elastomer of claim 11.

13. The process as claimed in claim 4, wherein (A-1) the polyethercarbonate polyol containing carbon-carbon double bonds has a content of carbon-carbon double bonds of 1.0% by weight to 6.0% by weight.

14. The process as claimed in claim 5, wherein (A-1) the polyethercarbonate polyol containing carbon-carbon double bonds has a $CO_2$ content of 5% by weight to 25% by weight.

15. The process as claimed in claim 1, wherein the molar ratio of the OH-reactive groups in the OH group-reactive component (B) to the OH groups of the polyol component (A) containing carbon-carbon double bonds is 1.1 to less than 2.0.

16. The process as claimed in claim 1, wherein the molar ratio of the OH-reactive groups in the OH group-reactive component (B) to the OH groups of the polyol component (A) containing carbon-carbon double bonds is 1.2 to 1.6.

* * * * *